(12) United States Patent
Fujimoto et al.

(10) Patent No.: US 8,274,704 B2
(45) Date of Patent: Sep. 25, 2012

(54) IMAGE PROCESSING APPARATUS AND METHOD FOR SELECTING A PROCESSING MODE BASED ON ATTRIBUTES OF ORIGINAL MULTIVALUED IMAGE DATA

(75) Inventors: Yasunori Fujimoto, Inagi (JP); Shinichi Miyazaki, Kawasaki (JP); Hiroki Horikoshi, Komae (JP); Akira Ichimura, Tokyo (JP); Naoko Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 12/335,185

(22) Filed: Dec. 15, 2008

(65) Prior Publication Data

US 2009/0161165 A1 Jun. 25, 2009

(30) Foreign Application Priority Data

Dec. 20, 2007 (JP) ................................. 2007-329339

(51) Int. Cl.
*H04N 1/40* (2006.01)
(52) U.S. Cl. ...................... 358/3.01; 358/3.02; 358/3.03; 358/1.9; 358/3.21; 358/3.13; 347/20; 347/66; 347/151; 347/166; 347/174
(58) Field of Classification Search .................. None
See application file for complete search history.

(56) References Cited

U.S. PATENT DOCUMENTS

| | | | | |
|---|---|---|---|---|
| 4,734,784 A | * | 3/1988 | Tanaka | 358/2.1 |
| 5,153,925 A | * | 10/1992 | Tanioka et al. | 382/272 |
| 5,748,794 A | * | 5/1998 | Maeda et al. | 382/251 |
| 5,841,551 A | * | 11/1998 | Nakatani et al. | 382/248 |
| 6,201,612 B1 | * | 3/2001 | Matsushiro et al. | 358/1.9 |
| 6,511,143 B1 | * | 1/2003 | Ishikawa et al. | 347/9 |
| 6,836,346 B2 | * | 12/2004 | Yoshizawa et al. | 358/1.9 |
| 7,312,901 B2 | * | 12/2007 | Yamada et al. | 358/3.14 |
| 7,436,550 B2 | * | 10/2008 | Aoki et al. | 358/3.03 |
| 7,633,650 B2 | * | 12/2009 | Fukuda | 358/2.1 |
| 7,876,961 B2 | * | 1/2011 | Miyagi | 382/190 |
| 7,965,892 B2 | * | 6/2011 | Kanatsu | 382/176 |
| 2001/0012113 A1 | * | 8/2001 | Yoshizawa et al. | 358/1.9 |
| 2002/0039192 A1 | | 4/2002 | Otsuka et al. | |
| 2002/0070998 A1 | | 6/2002 | Bloomberg | |
| 2002/0089685 A1 | * | 7/2002 | Kakutani | 358/1.14 |

(Continued)

FOREIGN PATENT DOCUMENTS

JP 2000-103088 4/2000

(Continued)

*Primary Examiner* — Dung Tran
(74) *Attorney, Agent, or Firm* — Canon U.S.A., Inc. IP Division

(57) ABSTRACT

An information processing apparatus processes, for each pixel, multivalued image data for a unit area of a recording medium, so as to form an image on the unit area with a plurality of relative movements between a recording head and the recording medium. The apparatus has a selector that selects a first processing mode for dividing the multivalued image data into a plurality of pieces of multivalued image data corresponding to the plurality of relative movements, and then quantizing each of the plurality of pieces of multivalued image data, or a second processing mode for quantizing the multivalued image data into quantized image data, and then dividing the quantized image data into a plurality of pieces of quantized image data corresponding to the plurality of relative movements. The selector selects the processing mode based on a content (attribute, grayscale, color, etc.) of the multivalued image data.

11 Claims, 26 Drawing Sheets

U.S. PATENT DOCUMENTS

| | | | |
|---|---|---|---|
| 2004/0257623 A1* | 12/2004 | Suzuki | 358/3.03 |
| 2005/0031203 A1* | 2/2005 | Fukuda | 382/176 |
| 2006/0066909 A1* | 3/2006 | Yamamoto | 358/3.13 |
| 2006/0158693 A1 | 7/2006 | Takahashi et al. | |
| 2007/0206228 A1* | 9/2007 | Miyagi | 358/3.21 |
| 2009/0161131 A1* | 6/2009 | Fujimoto et al. | 358/1.9 |

FOREIGN PATENT DOCUMENTS

| | | |
|---|---|---|
| JP | 2006-231736 | 9/2006 |

* cited by examiner

FIG. 16A

| 1/16 | 2/16 | 1/16 |
|---|---|---|
| 2/16 | 4/16 | 2/16 |
| 1/16 | 2/16 | 1/16 |

FIG. 16B

| 16 | 32 | 16 |
|---|---|---|
| 32 | 64 | 32 |
| 16 | 32 | 16 |

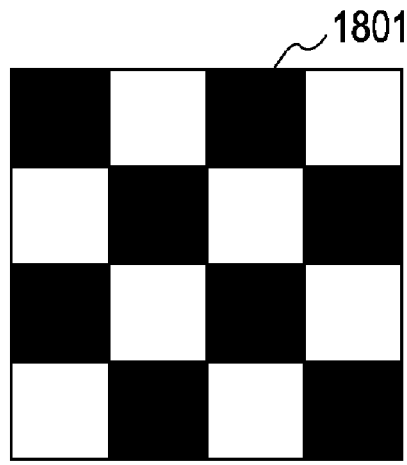
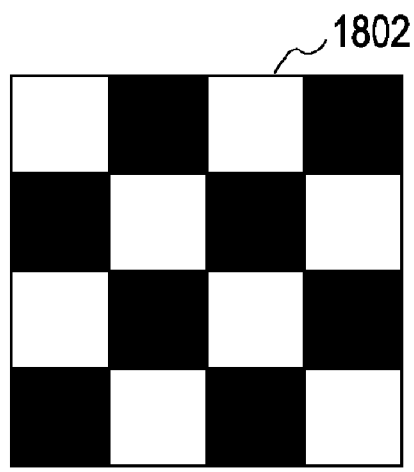
FIG. 18
PRIOR ART

FIG. 19
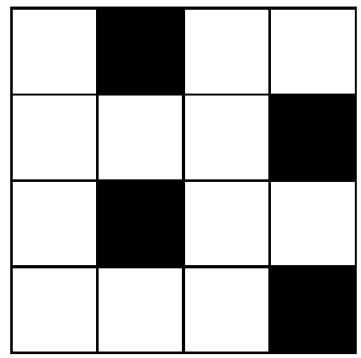
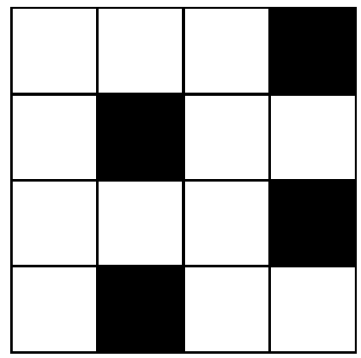
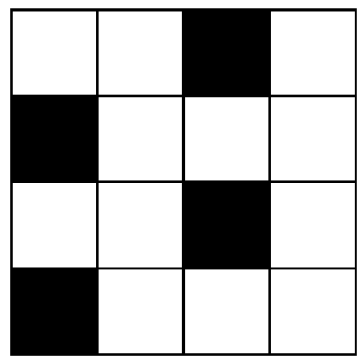
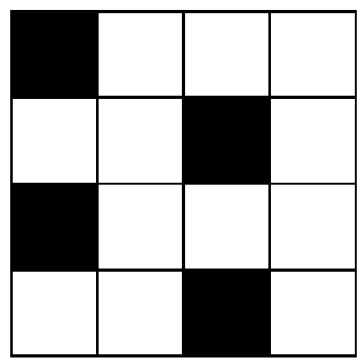

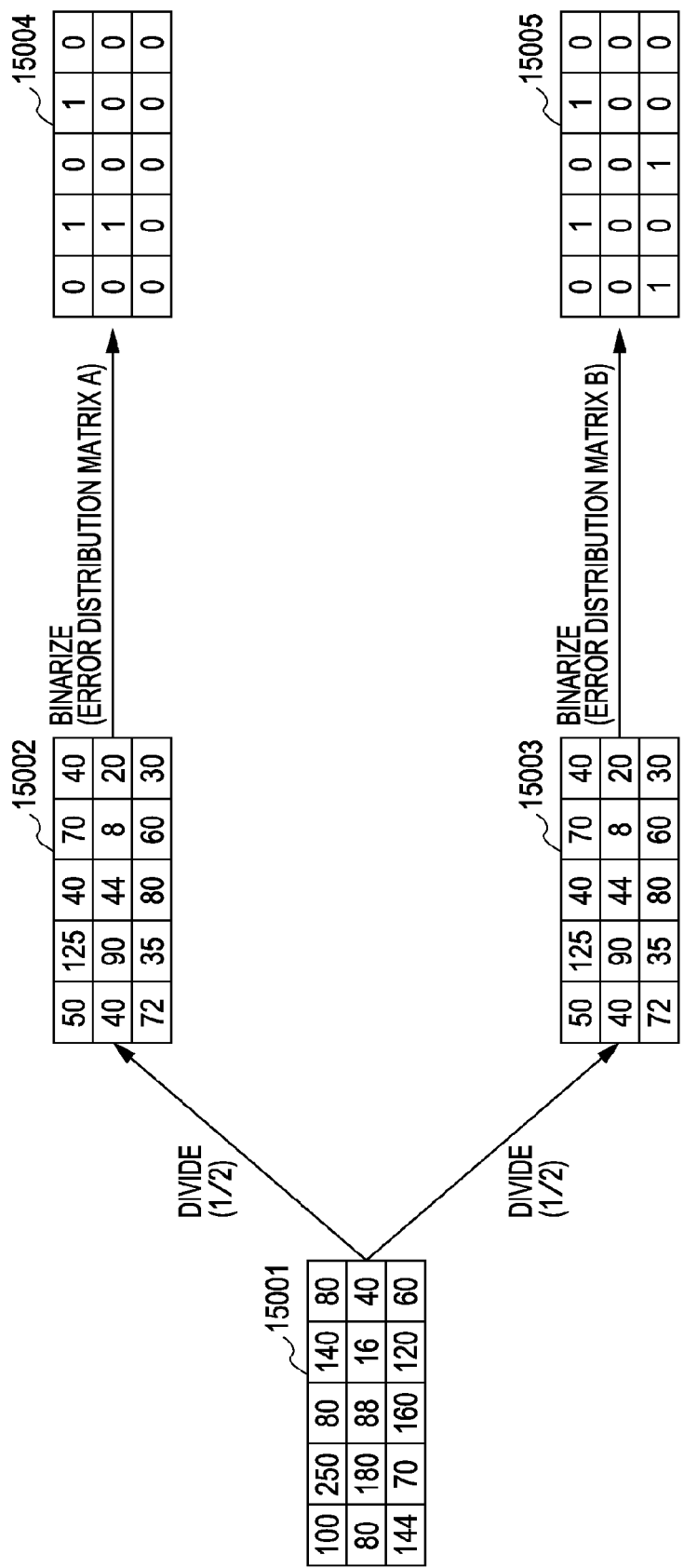

FIG. 23A

|  | * | 9/32 | 3/32 |
|---|---|---|---|
| 5/32 | 9/32 | 3/32 |  |
|  | 3/32 |  |  |

FIG. 23B

|  |  | * | 2/8 | 1/8 |
|---|---|---|---|---|
| 1/8 | 1/8 | 2/8 | 1/8 |  |

IMAGE PROCESSING APPARATUS AND METHOD FOR SELECTING A PROCESSING MODE BASED ON ATTRIBUTES OF ORIGINAL MULTIVALUED IMAGE DATA

BACKGROUND OF THE INVENTION

1. Field of the Invention

The present invention generally relates to an image processing apparatus and an image processing method for processing image data for a unit area of a recording medium, so as to form an image on the unit area, with a plurality of relative scans of a recording head with respect to the unit area of the recording medium, or a relative scan of a plurality of recording heads with respect to the unit area of the recording medium.

2. Description of the Related Art

As an example of recording methods employing a recording head having a plurality of recording elements, an inkjet recording method for forming dots on a recording medium by ejecting ink from each of the recording elements is known. Such inkjet recording apparatuses can be categorized into either a full-line type and a serial type based on a difference in the configurations thereof.

Full-line type recording apparatuses employ recording heads in which a plurality of recording elements corresponding to the width of a recording media is arranged. The recording apparatuses form an image by conveying a recording medium in a direction orthogonal to an arrangement direction of the recording elements, while ejecting ink from the recording heads. Such full-line type recording apparatuses may be suitable for office use because they can output images at a relatively high speed.

On the other hand, serial type recording apparatuses incrementally form an image by repeating a main recording scan for moving a recording head that ejects ink, and a conveying action for conveying a recording medium in a direction orthogonal to this main recording scan direction. Such serial type recording apparatuses may be suitable for personal use because they can be manufactured into a relatively small shape at low cost.

Regardless of whether the recording apparatuses are the full-line type or the serial type, an amount of ejected ink and an ejecting direction can vary between recording elements in a recording head including the plurality of recording elements arranged therein. Such variability may cause color density unevenness and streaks in images.

A multipass printing method is known as a technique for reducing such image degradation. In the multipass printing, image data to be recorded on a unit area of a recording medium is typically divided into pieces of image data corresponding to a plurality of scans, and the divided pieces of image data are sequentially recorded with the plurality of scans, whereby the image to be recorded on the unit area may be completed. According to such a multipass printing method, it may be possible to reduce the image degradation resulting from variability in the ejection of each recording element. As a result, relatively even and smooth images can be obtained. The advantages of such multipass printing may be enhanced as the number of passes, namely, the number of recording elements employed in recording of one scan raster, increases. However, the printing speed may also reduce as the number of passes increases. Accordingly, serial type recording apparatuses often prepare a plurality of recording modes that employ different numbers of passes.

Meanwhile, the above-described multipass printing method can also be applied to full-line type recording apparatuses. More specifically, when a plurality of recording element lines are provided for ink of an identical color along a direction in which a recording medium is conveyed (hereinafter, referred to as a conveyance direction) as shown for example in FIG. 1, an image can be recorded by allotting a raster extending in the conveyance direction to the plurality of recording elements. As a result, even if variability in ejection is caused between the recording elements, an effect thereof can be reduced.

At the time of such multipass printing, image data may be distributed to each recording scan of the serial type recording apparatuses or to each recording head of full-line type recording apparatuses. In the related art, such distribution is performed using mask patterns in which print-permitting pixels (1), regarding which printing of dots is permitted, and non-print-permitting pixels (0), regarding which printing of dots is not permitted, are arranged.

FIG. 18 is a schematic diagram showing examples of the mask patterns employable in two-pass multipass printing. Here, black areas represent print-permitting pixels (1), whereas white areas represent non-print-permitting pixels (0). Patterns 1801 and 1802 correspond to mask patterns that may be employed in the first and second recording scans, respectively. The patterns 1801 and 1802 may have a mutual complementary relationship.

By performing logical multiplication of such a mask pattern and binary image data, the binary image data may be divided into two pieces of binary image data to be recorded in respective recording scans. For example, as shown in FIG. 2, by dividing image data representing dots to be recorded on a unit area using the mask patterns (1801 and 1802) shown in FIG. 18, divided image data may be generated for both the first pass and the second pass. Since the divided pieces of binary image data corresponding to different scans also have a complementary relationship when a data division method (mask-employed division method) is performed using the mask patterns having the mutual complementary relationship, a probability that dots recorded in different scans overlap one another may be relatively low. Accordingly, a relatively high color density resulting from a relatively high dot coverage ratio can be realized, and improved graininess can be provided.

Now, there is increasing demand for higher image quality while such multipass printing is employed. In such a circumstance, there is a need for reduction in a color density change and a color density unevenness that may result from a shift of the recording position (registration) of each printing scan or of each recording element line. The shift of the recording position of each printing scan or of each recording element line may be caused by an alteration in a distance (paper distance) between a recording medium and an ejection orifice surface, and an alteration in a conveyed distance of the recording medium.

For example, referring to FIG. 2, a case is considered where positions of a plane of dots (○) recorded in a preceding recording scan and a plane of dots (◉) recorded in a following recording scan are shifted by an amount equivalent to one pixel in a main scanning direction or a sub scanning direction. In this case, the dots (○) recorded in the preceding recording scan and the dots (◉) recorded in the following recording scan completely overlap one another, and a blank area is exposed, due to which the color density of the image is decreased. If a distance between neighboring dots or an overlapping amount changes, even if the shift amount is not as large as one pixel, a coverage ratio of the dots with respect to the blank area may nonetheless change. This change in the coverage ratio can cause a change in color density of the image. The change in the color density of the image may then be recognized as color density unevenness.

Accordingly, as demand for higher image quality continues to increase, there is a need for an image data processing method that is employed in multipass printing and is capable of coping with a shift of the recording positions of the planes caused in response to changes in various recording conditions. Hereinafter, resistance against an alteration in the color density and unevenness in the color density caused by the shift of the recording positions of the planes, resulting from any recording condition change, is referred to as "robustness".

Japanese Patent Laid-Open No. 2000-103088 discloses an image data processing method for increasing the robustness. Japanese Patent Laid-Open No. 2000-103088 focuses on a fact that a change in image color density caused by a change in various recording conditions can result from a complete mutual complementary relationship of pieces of binary image data for different recording scans. As understood from this document, it is considered that multipass printing having superior "robustness" can be realized if pieces of image data for different recording scans are generated so that the degree of the complementary relationship therebetween is reduced. Accordingly, in Japanese Patent Laid-Open No. 2000-103088, multivalued image data is divided before binarization and the divided pieces of multivalued image data are then separately binarized. In this manner, a significant color density change may be prevented even if image data of different planes corresponding to different recording scans are recorded at shifted positions.

FIGS. 3A-3I are diagrams for describing a data division method disclosed in Japanese Patent Laid-Open No. 2000-103088. First, multivalued image data (see FIG. 3A) to be recorded on a unit area is divided into multivalued data (see FIGS. 3B and 3D) to be recorded in the first pass, and multivalued data (see FIGS. 3C and 3E) to be recorded in the second pass. Each piece of the multivalued data is separately binarized (see FIGS. 3F and 3G), whereby binary data (see FIG. 3H) to be recorded in the first pass, and binary data (see FIG. 3I) to be recorded in the second pass, are generated. Lastly, ink is ejected from a recording head in accordance with these pieces of binary data. As is clear from FIGS. 3H and 3I, the binary data for the first pass and the binary data for the second pass that are generated in the above-described manner may not have a complete complementary relationship. Accordingly, parts where dots of the first pass and dots of the second pass overlap (pixels having "1" in two planes) and parts where dots of the first pass and dots of the second pass do not overlap (pixels having "1" in only one of the planes) coexist.

FIG. 4 is a diagram showing an arrangement of dots recorded on a recording medium in accordance with the method disclosed in Japanese Patent Laid-Open No. 2000-103088. Referring to the drawing, black circles 21 represent dots recorded in the first pass, whereas white circles 22 represent dots recorded in the second pass. Shaded circles 23 represent overlapping dots recorded in both of the first and second passes. In this example, since the complementary relationship between the first pass and the second pass is incomplete, parts where two dots overlap and parts where no dot is recorded (blank areas) exist, which is different from a case of having a complete complementary relationship as shown in FIG. 2.

As in the case of FIG. 2, a case is considered where positions of dots recorded in the first pass, and positions of dots recorded in the second pass, are shifted by an amount equivalent to one pixel in a main scanning direction or a sub scanning direction. In this case, the dots of the first and second passes, which are not supposed to overlap unless the positional shift is caused, do overlap. On the other hand, the dots 23, which are supposed to overlap unless the positional shift is caused, do not overlap. Accordingly, the coverage ratio of the dots to the blank area does not change as much, and a change in color density of the image is less in an area having a predetermined size. Therefore, even if an alteration in a distance (paper distance) between a recording medium and an ejection orifice surface, and an alteration in a conveyed distance of the recording medium are caused, the method disclosed in Japanese Patent Laid-Open No. 2000-103088 may suppress a change in image color density caused by these alterations.

Furthermore, Japanese Patent Laid-Open No. 2006-231736 discloses a technique for distributing, like Japanese Patent Laid-Open No. 2000-103088, multivalued image data to a plurality of recording scans or a plurality of recording element lines, while changing a data distribution ratio on the basis of the positions of pixels. Japanese Patent Laid-Open No. 2006-231736 describes the advantage of suppressing banding and color unevenness that may be caused in multipass printing by changing the distribution ratio linearly, periodically, like a sine wave, or like a combined wave of a high-frequency wave and a low-frequency wave, with respect to a position in a main scanning direction.

Although the methods (hereinafter, referred to as a "multivalued data division method") disclosed in Japanese Patent Laid-Open Nos. 2000-103088 and 2006-231736 provide robustness that may be superior to that provided by the mask-employing division method, the methods may also have disadvantages as compared to the mask-employing division method. For example, the image color density may be more likely to become low in the multivalued data division method than in the mask-employing division method because of the lower dot coverage ratio. In addition, since a blank area may be created, as shown in FIG. 4, a contrast and sharpness of images may be more likely to decrease.

Thus, when images are recorded while emphasizing the color density, the contrast, and the sharpness rather than the robustness, the mask-employing division method may be employed in some cases rather than the multivalued data division method. Since a division method may differ depending on a content(type) of image data in this manner, in certain instances it may not be as effective to employ the multivalued data division method, regardless of the content (type) of the image data.

SUMMARY OF THE INVENTION

According to an aspect of the present invention, an image processing apparatus is provided for processing, for each pixel, multivalued image data for a unit area of a recording medium, so as to form an image on the unit area with a plurality of relative movements between a recording head and the recording medium. The image processing apparatus includes: a selector capable of selecting a first processing mode for dividing the multivalued image data into a plurality of pieces of multivalued image data corresponding to the plurality of relative movements, and then quantizing each of the plurality of pieces of multivalued image data, or a second processing mode for quantizing the multivalued image data into quantized image data, and then dividing the quantized image data into a plurality of pieces of quantized image data corresponding to the plurality of relative movements. The selector selects, for each pixel, the first processing mode or the second processing mode based on a content of the multivalued image data.

According to another aspect of the present invention, an image processing apparatus is provided for processing, for each pixel, multivalued image data for a unit area of a recording medium, so as to form an image on the unit area with a relative movement of a plurality of recording heads with respect to the unit area of the recording medium. The image processing apparatus includes: a selector capable of selecting a first processing mode for dividing the multivalued image data into a plurality of pieces of multivalued image data corresponding to the plurality of recording heads, and then quantizing each of the plurality of pieces of multivalued image data, or a second processing mode for quantizing the multivalued image data into quantized image data, and then dividing the quantized image data into a plurality of pieces of quantized image data corresponding to the plurality of recording heads. The selector selects, for each pixel, the first processing mode or the second processing mode based on a content of the multivalued image data.

According to still another aspect of the present invention, an image forming apparatus is provided for forming an image on a unit area of a recording medium with M relative movements of a recording head with respect to the unit area of the recording medium. The image forming apparatus includes: a first image processor configured to divide multivalued image data into M pieces of multivalued image data corresponding to the M relative movements, and then binarize each of the M pieces of multivalued image data to generate M pieces of binary image data; a second image processor configured to binarize the multivalued image data to generate binary image data, and then divide the binary image data into M pieces of binary image data corresponding to the M relative movements; a selector configured to select the first image processor or the second image processor based on a content of the multivalued image data; and a driver configured to drive the recording head during the M relative movements in accordance with the M pieces of binary image data generated by the first image processor or the second image processor as selected by the selector.

According to a further aspect of the present invention, an image forming apparatus is provided for forming an image on a unit area of a recording medium with a relative movement of M recording heads with respect to the unit area of the recording medium. The image forming apparatus includes: a first image processor configured to divide multivalued image data into M pieces of multivalued image data corresponding to the M recording heads, and then binarize each of the M pieces of multivalued image data to generate M pieces of binary image data; a second image processor configured to binarize the multivalued image data to generate binary image data, and then divide the binary image data into M pieces of binary image data corresponding to the M recording heads; a selector configured to select the first image processor or the second image processor based on a content of the multivalued image data; and a driver configured to drive the M recording heads in accordance with the M pieces of binary image data generated by the first image processor or the second image processor as selected by the selector.

Further features of the present invention will become apparent from the following description of exemplary embodiments with reference to the attached drawings.

BRIEF DESCRIPTION OF THE DRAWINGS

FIGS. 16A and 16B are diagrams showing examples of coefficients employed when a restriction information calculator executes a filtering operation on binary data for a first plane output from a binarizer, and a calculation result thereof, respectively.

FIG. 18 is a schematic diagram showing examples of mask patterns employable in two-pass multipass printing.

FIG. 19 is a diagram showing examples of mask patterns that are in a mutual complementary relationship and employable in four-pass multipass printing.

FIG. 22 is a diagram showing a specific example of processing executed by an image division precedent processing unit.

FIGS. 23A and 23B are diagrams showing examples of error distribution matrices employed when a binarizer executes error diffusion processing.

DESCRIPTION OF THE EMBODIMENTS

Figure 1:
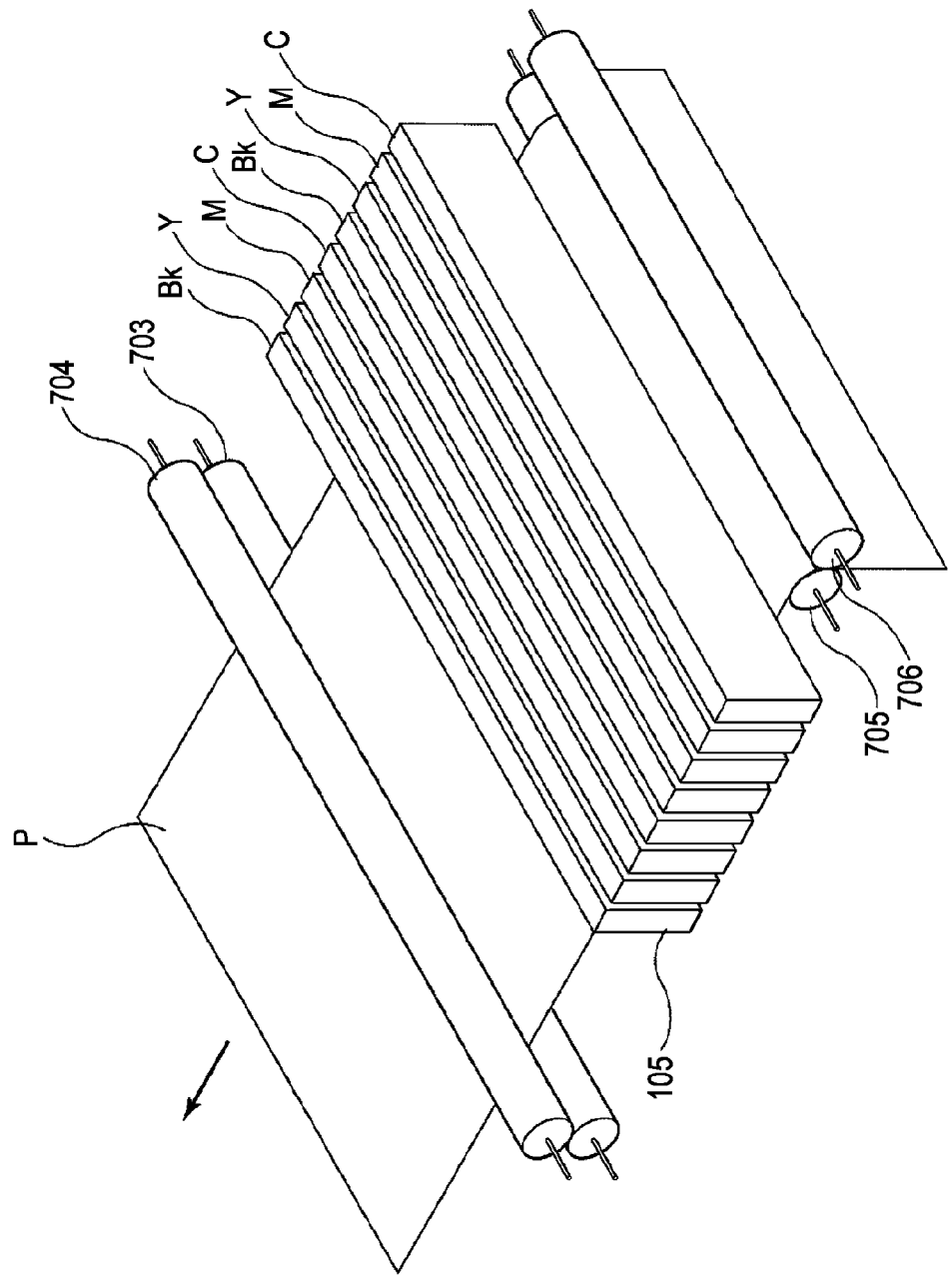
FIG. 1 is a schematic diagram for describing an internal configuration of a full-line type inkjet recording apparatus employed in an exemplary embodiment of the present invention.

Exemplary embodiments of the present invention will be described in detail below with reference to the accompanying drawings. Although an inkjet recording apparatus is employed as an example in the embodiments to be described below, the present invention is not intended to be limited to only the inkjet recording apparatus. Apparatuses other than the inkjet recording apparatus can also demonstrate advantages of the present invention, and can also be employed, for example when the apparatuses employ a method for recording an image on a recording medium with recording heads for forming dots during a relative movement between the recording heads and the recording medium.

The terms used in this specification will now be defined. First, a "relative scan (relative movement)" indicates an action for moving (conveying) a recording medium relative to recording heads in a full-line type recording apparatus. On the other hand, in a serial type recording apparatus, the "relative scan (relative movement)" indicates an action for moving (scanning) a recording head relative to a recording medium.

In addition, "multipass printing" indicates a printing method for completing an image to be recorded on a unit area of a recording medium with a plurality of relative scans of a recording head or a relative scan of a plurality of recording heads (recording elements) relative to the unit area. More specifically, as in an exemplary embodiment 1 to be described below, a case for conveying a recording medium relative to a plurality of recording heads (recording elements) once is also referred to as "multipass printing". Here, a "number of multipass (M)" indicates the number of relative movements of recording heads of an identical color (recording elements of an identical color) with respect to the unit area. The value "M" may be an integer equal to or greater than 2. When the value M is equal to 2, printing is called two-pass multipass printing. When the value M is equal to 4, printing is called four-pass multipass printing. When S recording heads of an identical color (S recording elements of an identical color) moves relative to the unit area T times, the value M is equal to S×T. For example, as in an exemplary embodiment 5, when one recording head of an identical color (one recording element of an identical color) moves relative to the unit area twice, the values S and T are equal to 1 and 2, respectively. Thus, the value M is equal to 2. Additionally, as in the exemplary embodiment 1, when two recording heads of an identical color (two recording elements of an identical color) moves relative to the unit area once, the values S and T are equal to 2 and 1, respectively. Thus, the value M is also equal to 2. In M-pass (where, M is an integer equal to or greater than 2) multipass printing, pieces of image data of M planes corresponding to the number of multipass M are generated on the basis of multivalued image data for a unit area. These pieces of image data of M planes are recorded in the respective M-th passes.

In addition, a "unit area" of a recording medium may indicate an area constituted by a predetermined (the predetermined number is an integer of 1 or greater) number of pixels. Note that the "pixel" indicates a region corresponding to a minimum unit that a gradation expression can be performed on by the multivalued image data.

Additionally, a "plane" indicates a collection of image data corresponding to a relative movement between a recording head and a recording medium, or a collection of image data corresponding to a plurality of recording heads. Accordingly, different planes correspond to different relative movements or different recording heads.

FIG. 1 is a schematic diagram for describing an internal configuration of a full-line type inkjet recording apparatus employed in an exemplary embodiment 1 of the present invention. A recording medium P is fed by a feeding roller 705 and an auxiliary roller 706 and then conveyed in a direction of a conveying roller 704 and an auxiliary roller 703. The recording medium P is conveyed in a relative scanning direction (conveyance direction) indicated by an arrow while being sandwiched by these two pairs of rollers. During such an operation for conveying the recording medium P, ink is ejected from recording elements of recording heads 105 and an image is recorded on the recording medium P. This operation for conveying the recording medium corresponds to a relative scan (relative movement) between a recording medium and recording heads.

Two lines of the full-line type recording heads 105 may be arranged, for each of black (Bk), cyan (C), magenta (M), and yellow (Y) heads, in a parallel relationship to each other along the conveyance direction, as shown in the drawing. In addition, a plurality of recording elements may be arranged along a direction orthogonal to the conveyance direction in each recording head. Image data of each of the Bk, C, M, and Y heads is divided into two planes. Dots are recorded by two recording heads (two kinds of recording elements) of each color on an area (unit area) of one pixel width that extends in the conveyance direction. In this exemplary embodiment, two-pass printing for recording image data in an area (unit area) of one pixel width is executed by allotting the image data to the two recording heads for ejecting ink of an identical color during one relative movement between the recording heads and the recording medium.

Figure 5:
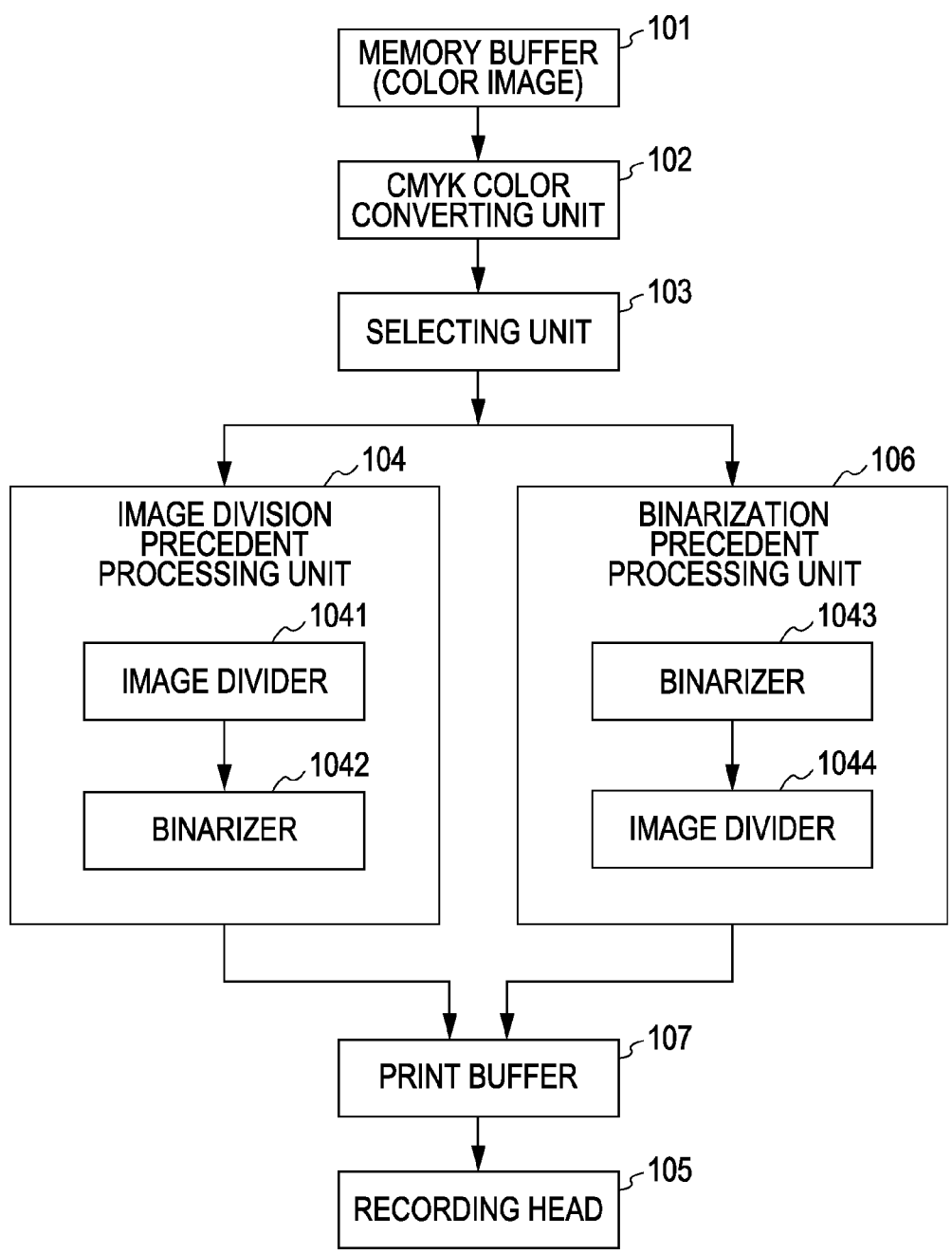
FIG. 5 is a block diagram for describing an image processing process executed by a recording apparatus employable in an exemplary embodiment of the present invention.

FIG. 5 is a block diagram for describing an image processing process executed by the recording apparatus according to this exemplary embodiment. For example, upon receiving image data to be recorded from a host apparatus connected to the outside, the image data is stored in a memory buffer 101 included in the recording apparatus. At this time, the image data may be multivalued luminance data (R, G, and B), which is represented by 8-bit gradation, namely, 256-level gradation for each pixel, for example. The luminance data of each pixel stored in the memory buffer 101 is then transferred to a CMYK color converting unit 102. The CMYK color converting unit 102 converts the luminance data into multivalued (8-bit 256-level gradation) color density data corresponding to colors of ink employed by the recording apparatus.

A selecting unit 103 selects whether to perform the following processing with an image division precedent processing unit (e.g., first image processor) 104 or a binarization precedent processing unit (e.g., second image processor) 106 based on a content (e.g., type) of image data of each pixel. As described later, the image division precedent processing unit (e.g., first image processor) 104 executes a first processing mode for performing quantization processing (e.g., binarization in this exemplary embodiment) after image division processing. On the other hand, the binarization precedent processing unit (e.g., second image processor) 106 executes a second processing mode for performing image division processing after quantization processing (e.g., binarization in this exemplary embodiment).

Figure 6:
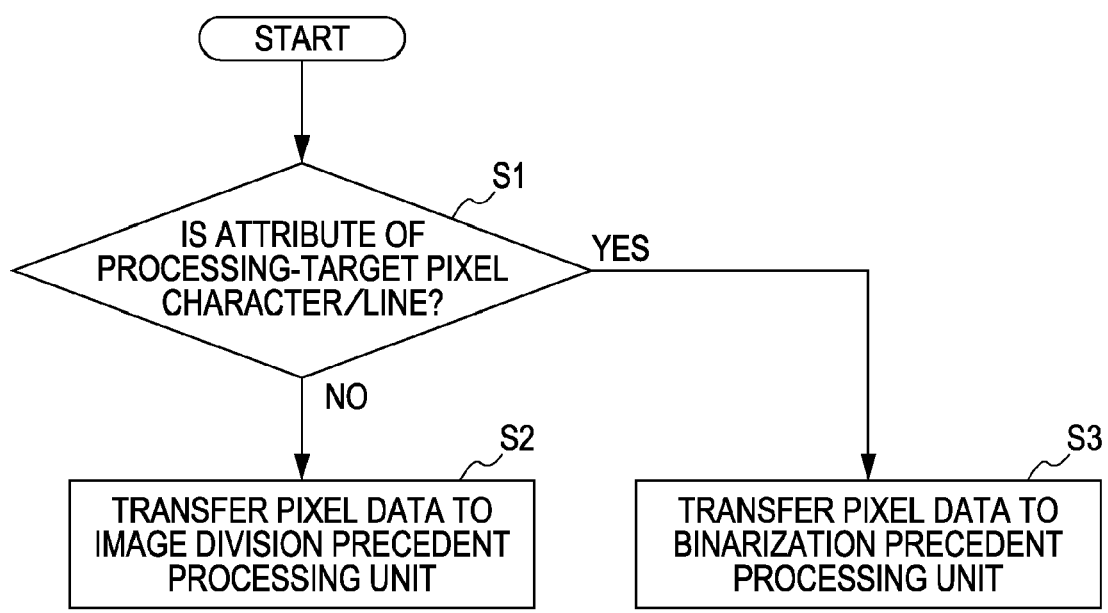
FIG. 6 is a flowchart for describing selection processing executed on each pixel by a selecting unit according to an exemplary embodiment of the present invention.

FIG. 6 is a flowchart for describing mode selection processing executed on each pixel by the selecting unit 103 according to this exemplary embodiment. At step S1, the selecting unit 103 determines whether an attribute of a focused processing-target pixel is a character/line or not. If it is determined that the attribute of the pixel is neither a character nor a line (NO in step S1), the process proceeds to step S2. At step S2, the selecting unit 103 selects the image division precedent processing unit (e.g., first image processor) 104 to execute the first processing mode, and transfers the processing-target pixel data to the image division precedent processing unit 104. On the other hand, if it is determined that the attribute of the pixel is a character or a line (YES in step Si), the process proceeds to step S3. At step S3, the selecting unit 103 selects the binarization precedent processing unit (e.g., second image processor) 106 to execute the second processing mode, and transfers the processing-target pixel data to the binarization precedent processing unit 106. Here, the first image processor performs a series of processing (e.g., first processing mode) for dividing the multivalued image data into a plurality of pieces of multivalued image data corresponding to a plurality of recording heads, and then quantizing (e.g., binarizing) the plurality of pieces of multivalued image data. On the other hand, the second image processor performs a series of processing (e.g., second processing mode) for quantizing (e.g., binarizing) the multivalued image data into quantized image data (e.g., binary image data), and then dividing the quantized image data into a plurality of pieces of quantized image data corresponding to a plurality of recording heads.

Referring back to FIG. 5, an image divider (e.g., first divider) 1041 divides the multivalued image data fed to the image division precedent processing unit 104 into multivalued data of two planes. At this time, the image divider 1041 can divide the multivalued image data evenly into two planes, or can divide the multivalued image data into two planes at different division ratios, for example as described in Japanese Patent Laid-Open No. 2006-231736. A binarizer (e.g., first quantizer) 1042 binarizes, for each plane, respective multivalued image data of the two planes divided by the image divider 1041. This binarization method may be, for example, at least one of an error diffusion method and a dither matrix method. However, different binarization methods may also be employed between these two planes. In particular, binarization processing may be performed so that parts where dots overlap and parts where dots do not overlap coexist when M planes are overlapped, as shown for example in the embodiment of FIG. 22, which will be described later. For example, when error diffusion processing is employed as the binarization processing, the binarization results may be made to indicate different values by changing at least one of a threshold and an error distribution matrix, even if image data of an identical gradation level is input. For example, by employing an error distribution matrix as shown in the embodiment of FIG. 23A in error diffusion processing for one plane, and employing an error distribution matrix as shown in the embodiment of FIG. 23B in error diffusion processing for the other plane, it may be possible to make the dot arrangement different between the planes. In addition, dot arrangement can also be made different between the planes by employing different dither matrices for one plane and the other plane. Furthermore, the dot arrangement can be made different between the planes by employing the dither matrix method for one plane and the error diffusion method for the other plane.

FIG. 22 shows a specific example of the first processing mode executed by the image division precedent processing unit (e.g., first image processor) 104, as shown for example in the embodiment of FIG. 5. The image divider 1041 divides multivalued image data 15001 to be recorded on a unit area, constituted by 5×3 pixels, into two pieces of image data. In this way, the multivalued image data 15001 is divided into multivalued image data 15002 for the first pass, and multivalued image data 15003 for the second pass. The binarizer 1042 binarizes each piece of the multivalued image data 15002 and 15003 divided by the image divider 1041 using the error diffusion method. In this manner, binary image data 15004 for the first pass, and binary image data 15005 for the second pass, are generated. More specifically, the binary image data 15004 for the first pass is generated by performing error diffusion processing on the multivalued image data 15002 for first pass using the error distribution matrix A, as shown in the embodiment of FIG. 23A. In addition, the binary image data 15005 for the second pass is generated by performing error diffusion processing on the multivalued image data 15003 for the second pass using the error distribution matrix B, as shown in the embodiment of FIG. 23B. Meanwhile, "*" shown in FIGS. 23A and 23B represents a focused pixel.

Figure 4:
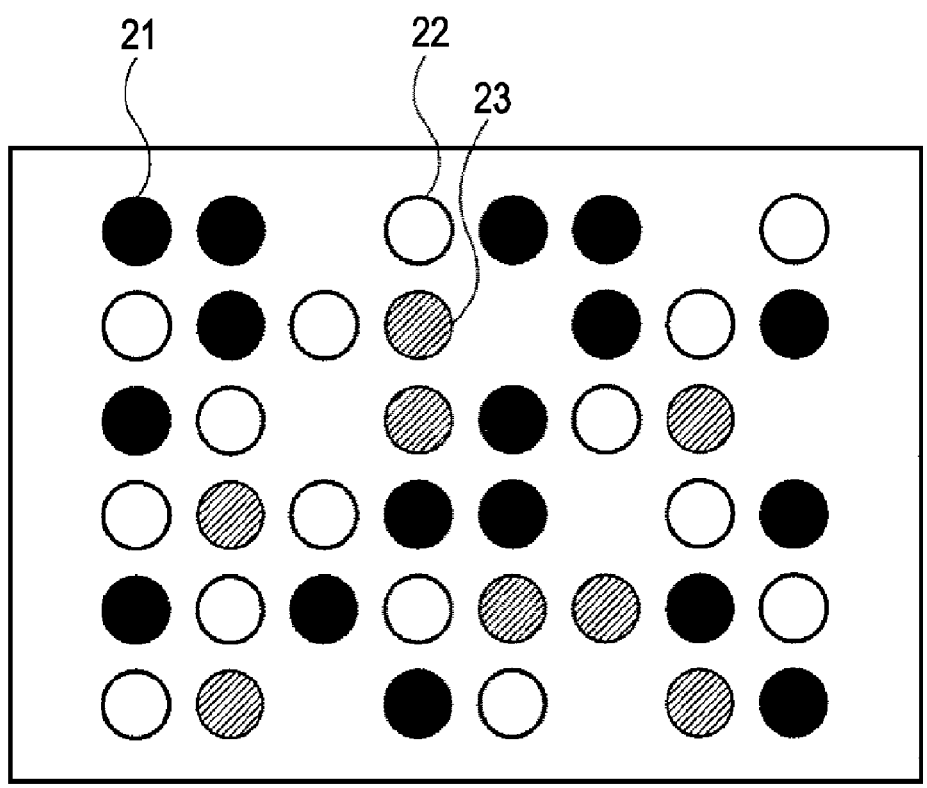
FIG. 4 is a diagram showing an example of an arrangement of dots recorded on a recording medium.

According to the above-described processing, parts where dots overlap (pixels having "1" in both planes) and parts where dots do not overlap (pixels having "1" in only one of the planes), can coexist when two planes 15004 and 15005 are overlapped. Accordingly, as described with reference to the example shown in FIG. 4, an alteration in image color density can be suppressed even if a shift of recording positions is caused due to at least one of an alteration in a distance between a recording medium and an ejection orifice surface, and an alteration in a conveyed distance of the recording medium. As described above, the first processing mode executed by the image division precedent processing unit (e.g., first image processor) 104 realizes image processing that provides improved robustness.

On the other hand, a binarizer 1043 (e.g., second quantizer) binarizes multivalued image data fed to the binarization precedent processing unit 106. An image divider 1044 (e.g., second divider) then divides the binary image data generated by the binarizer 1043 into two planes. As in the case of the binarizer 1042, a binarization method employed by this binarizer 1043 may be, for example, at least one of an error diffusion method and a dither matrix method.

Figure 2:
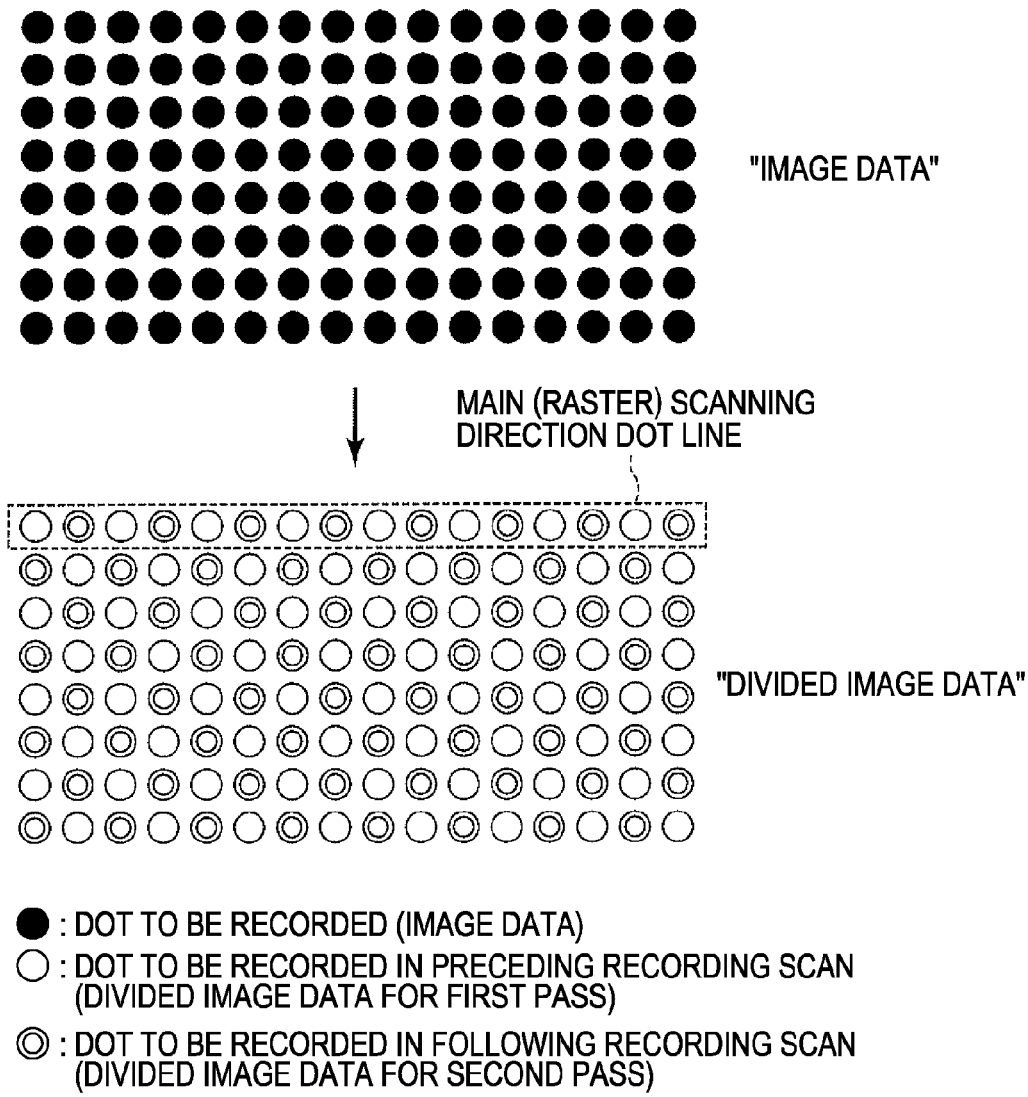
FIG. 2 is a diagram showing an example of a result obtained by dividing binary image data into divided pieces of image data corresponding to two recording scans using mask patterns shown in the embodiment of FIG. 18.
Figure 3:
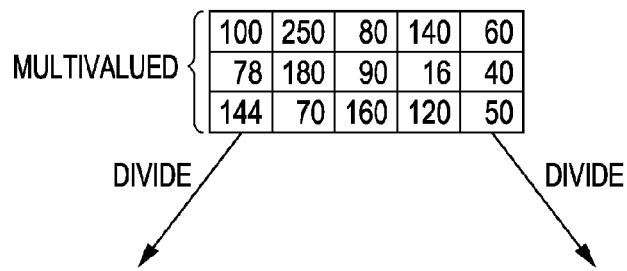
FIGS. 3A to 3I are block diagrams showing a specific example of division processing.

In addition, an image division method employed by the image divider 1044 is not particularly limited. For example, mask patterns having a mutual complementary relationship, such as those shown in the embodiment of FIG. 18, may be employed, or random mask patterns, such as those described in Japanese Patent Laid-Open No. 7-52390, may be employed. Additionally, the image data may be divided without using mask patterns, so that recording-target pixels of an identical plane are not consecutively arranged vertically and horizontally, as shown for example in FIG. 2. Advantages of this exemplary embodiment can be demonstrated with any given method, for example as long as divided pieces of binary image data have a mutual complementary relationship.

Figure 24:
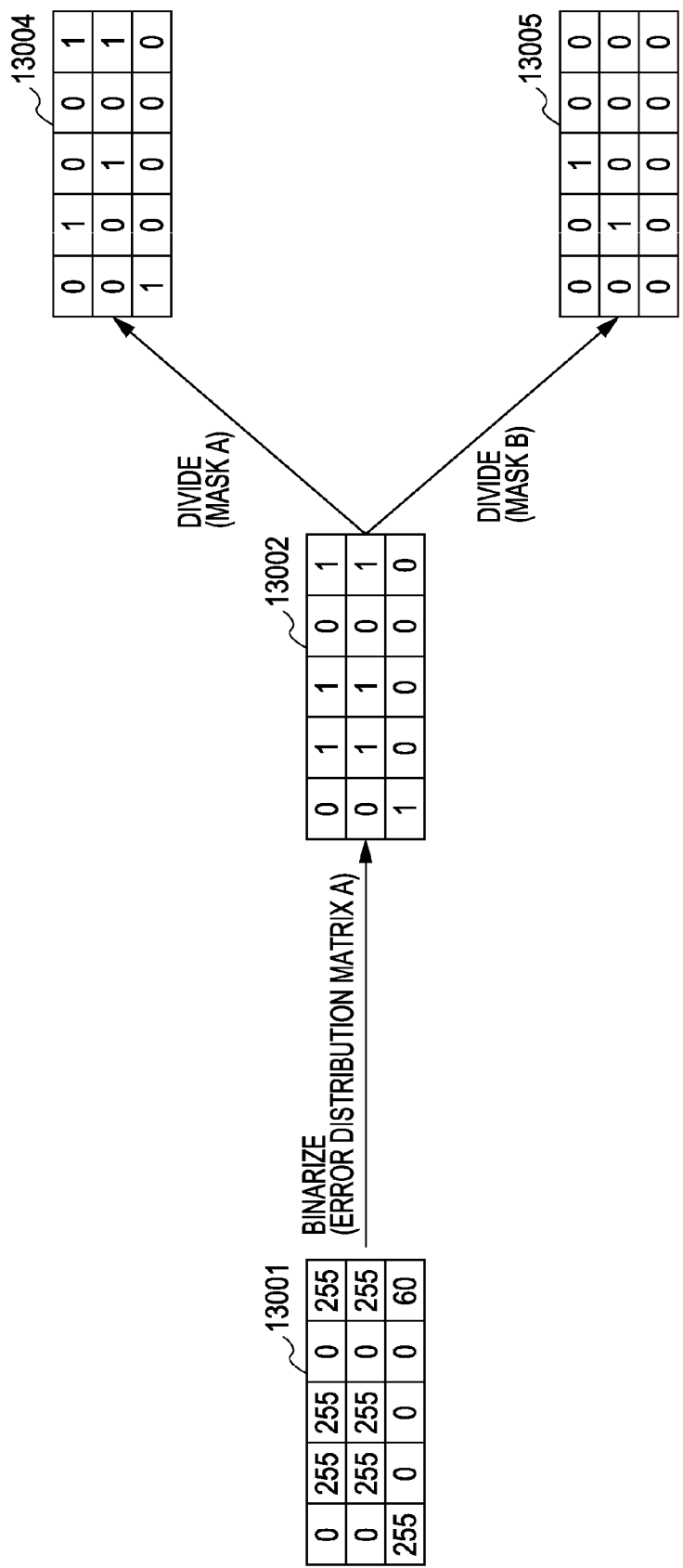
FIG. 24 is a diagram showing a specific example of processing executed by a binarization precedent processing unit.
Figure 25A:
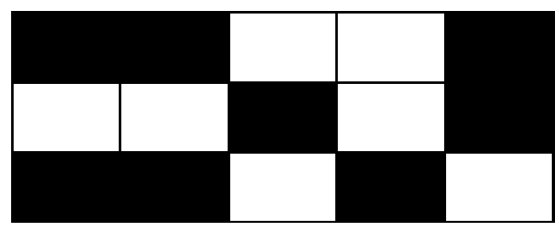
FIGS. 25A and 25B are diagrams showing examples of mask patterns employed in division processing executed by an image divider.
Figure 25B:
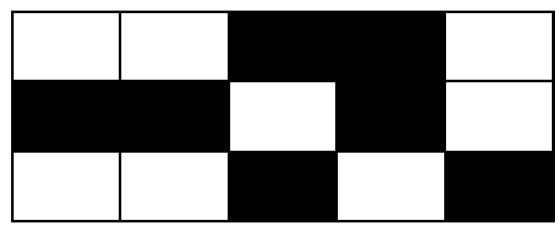

FIG. 24 shows a specific example of the second processing mode executed by the embodiment of the binarization precedent processing unit (e.g., second image processor) 106 shown in FIG. 5. The binarizer 1043 performs binarization processing on multivalued image data 13001 to be recorded on a unit area constituted by 5×3 pixels in accordance with an error diffusion method using the error distribution matrix A, as shown in the embodiment of FIG. 23A. In this manner, binary image data 13002 to be recorded on the unit area is generated. The image divider 1044 then divides the binary image data 13002 generated by the binarizer 1043 into binary image data 13004 for the first pass, and binary image data 13005 for the second pass, using mask patterns. For example, the binary image data 13004 for the first pass may be generated by thinning out the binary image data 13002 using a mask pattern A, as shown in the embodiment of FIG. 25A. In addition, the binary image data 13005 for the second pass may be generated by thinning out the binary image data 13002 using a mask pattern B, as shown in the embodiment of FIG. 25B. In this manner, the binary image data 13004 for the first pass, and the binary image data 13005 for the second pass, are generated. Referring to FIGS. 25A and 25B, black areas represent print-permitting pixels, whereas white areas represent non-print-permitting pixels. According to the above-described processing mode, parts where dots overlaps (pixels having "1" in both planes) do not exist when the two planes (13004 and 13005) are overlapped and the planes have a complete complementary relationship. Accordingly, graininess due to overlap of dots does not substantially increase, and relatively high-quality images having less graininess can be obtained.

As described above, the pieces of image data of two planes binarized by either the image division precedent processing unit 104 or the binarization precedent processing unit 106 may be temporarily stored in print buffers 107 for the respective planes. The image data is read out from the respective print buffers during a relative scan, and two recording heads corresponding to ink of an identical color may be driven in accordance with the read out image data, whereby the ink is ejected. In this way, an image may be formed on a unit area (one pixel or one pixel line) of a recording medium with a relative scan of a plurality of recording heads.

Figures 7A, 7B:
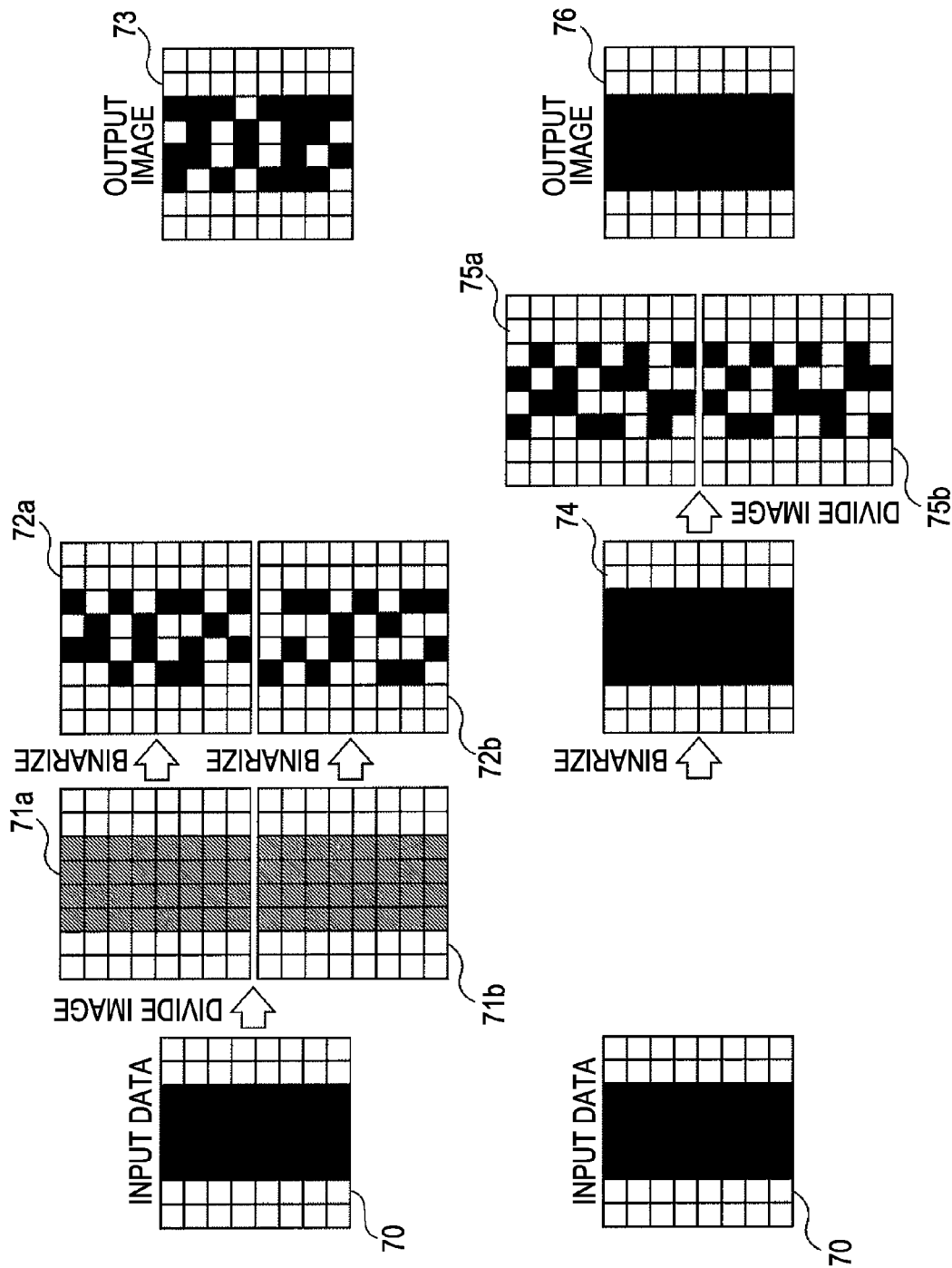
FIGS. 7A and 7B are schematic diagrams for comparing specific examples of processing executed by an image division precedent processing unit and a binarization precedent unit according to an exemplary embodiment of the present invention, respectively.

FIGS. 7A and 7B are schematic diagrams for comparing processing executed by the image division precedent processing unit 104 with processing executed by the binarization precedent processing unit 106 in accordance with this exemplary embodiment. Here, image processing and recording states in units of pixels obtained when the CMYK color converting unit 102 transfers an image of a line having signal values equal to 255, which is the highest color density, to the image division precedent processing unit 104 and the binarization precedent processing unit 106, are shown.

FIG. 7A is a diagram showing an image processing and recording state resulting from the processing executed by the embodiment of the image division precedent processing unit 104. The image divider 1041 divides a line image 70 constituted by signal values equal to 255 and signal values equal to 0 into two planes 71a and 71b, each of which is constituted by signal values equal to 128 and signal values equal to 0. Binary images 72a and 72b for the two planes are obtained by separately performing binarization processing on each of the planes using an error diffusion method. The two planes 71a and 71b, constituted by multivalued data, originally have identical values. However, since different thresholds or different distribution coefficient matrices are employed in the error diffusion processing executed on the respective image data, the two binarized planes 72a and 72b do not indicate an identical value. An output image 73 is a result obtained by overlapping the two planes of binary data obtained in this manner. Since the two binarized planes 72a and 72b do not have a mutual complementary relationship, areas where pixels are not recorded exist in the line of the output image 73 in places.

On the other hand, FIG. 7B is a diagram showing an image processing and recording state resulting from processing executed by the embodiment of the binarization precedent processing unit 106. The binarizer 1043 converts the line image 70 constituted by signal values equal to 255 and signal values equal to 0 into an image 74. In general, multivalued image data, in which data of the signal value equal to 255 and data of the signal value equal to 0 are separately arranged as in the line image 70, is converted into binary image in which signal values equal to 1 (black) and 0 (white) are arranged as shown in the image 74, using any given binarization processing method. The image divider 1044 evenly divides the binarized image data 74 of each pixel into two planes to yield binary images 75a and 75b of two planes. Since the binary images 75a and 75b are in a mutual complementary relationship, an output image 76 is obtained by overlapping these two planes. An area where pixels are not recorded does not exist in the line of the output image 73.

In images of lines or characters, the image color density, the contrast, or the sharpness is often considered to be more important than in images of other attributes. Accordingly, in this exemplary embodiment, the selecting unit 103 selects a mode so that the binarization preceding processing (e.g., second processing mode) in which image data is not lost, as in the output image 76, is executed on image data having the attribute of lines or characters.

In contrast, in images of photographs and graphics, image color density is not so high and dots are often arranged on a recording medium at a distance where the dots may or may not overlap. More specifically, a coverage ratio on a recording medium, namely, the image color density, is more likely to change in accordance with the existence or absence of overlapping dots, and images of photographs and graphics may be images that do not have superior robustness. On the other hand, evenness or gradation of the images may be considered to be more important than in images of characters and lines. Accordingly, in this exemplary embodiment, the selecting unit 103 selects the mode so that the image division preceding processing (e.g., first processing mode) offering improved robustness, as shown in FIG. 7A, is executed on image data having the attribute other than the lines and characters.

Figure 8A:
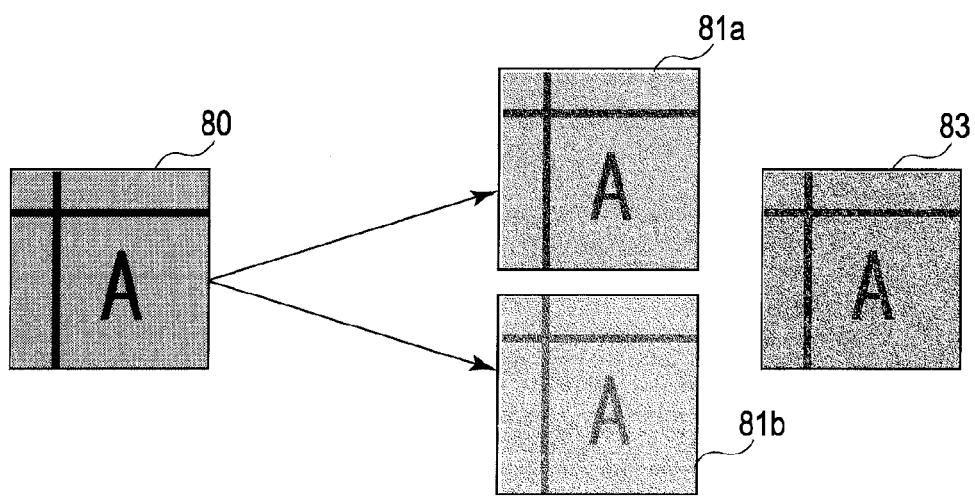
FIGS. 8A and 8B are diagrams for describing examples of advantages of the present invention.
Figure 8B:
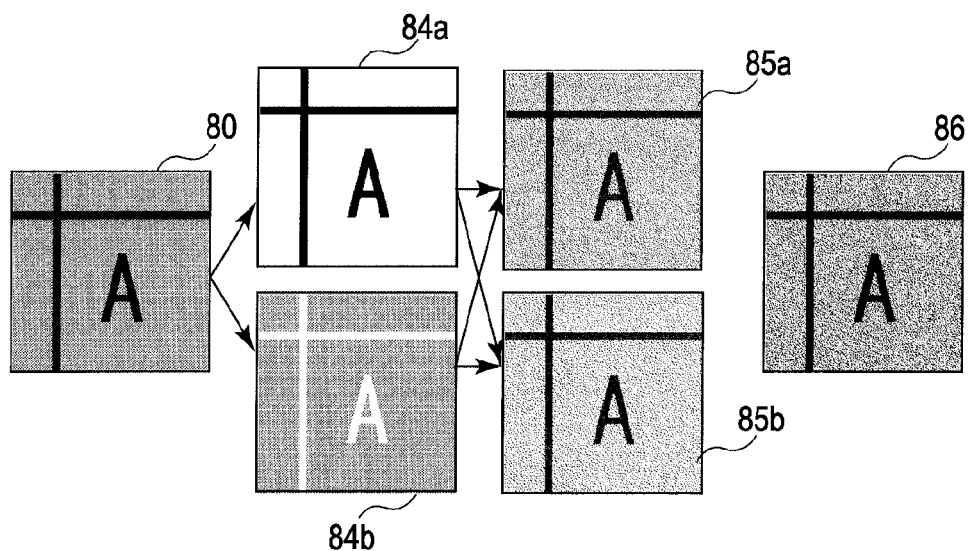

FIGS. 8A and 8B are diagrams for describing advantages of this exemplary embodiment. FIG. 8A is a diagram showing an image processing and recording state resulting from processing that emphasizes robustness, as disclosed in Japanese Patent Laid-Open No. 2000-103088. Here, an original image 80 is constituted by a character and lines having a signal value equal to 255 and an even halftone image having an intermediate signal value (e.g., 127). According to the method disclosed in Japanese Patent Laid-Open No. 2000-103088, both of the area containing the character and the lines and the area of the even halftone image of the original image 80 are divided into two multivalued planes. Binarization processing is then performed to yield two binary plane images 81a and 81b. An output image 83 is obtained by overlapping these two planes 81a and 81b. Since missing parts exist in the character and the lines of this output image 83, the color density, contrast, and sharpness of the character and the lines decrease.

On the other hand, FIG. 8B is a diagram showing an image processing and recording state resulting from processing according to an exemplary embodiment in accordance with the present invention. According to this exemplary embodiment, the selecting unit 103 divides the original image 80 into an image 84a containing the character and the lines, and an even halftone image 84*b*. The division processing is executed on the image 84*a* containing the character and the lines, after execution of binarization processing. On the other hand, the binarization processing is performed on the halftone image 84*b*, after executing division processing on the multivalued halftone image as in the case of Japanese Patent Laid-Open No. 2000-103088. As a result, two binary plane images 85*a* and 85*b* are obtained. A result obtained by overlapping these two plane images 85*a* and 85*b* corresponds to an output image 86. Since a missing part does not exist in the character and the lines of this output image 86, the color density, contrast, and sharpness of the character and the lines do not substantially decrease and a relatively high-quality character-and-line containing image can be obtained. In addition, since parts where dots of the two planes overlap exist in the photograph or graphic image (e.g., non-character image or non-line image) of the output image 86, an image having improved robustness can be obtained.

As described above, according to this exemplary embodiment, since an image processing mode suitable for a content (e.g., type) of image data is selected, a high-quality image can be obtained even if an image containing pixels of different kinds, such as a character, line, photograph, and graphic, is recorded. In particular, if a shift of recording positions is caused during recording of the above-described image containing pixels of different kinds, a photograph or a graphic having less color density change can be obtained without substantially decreasing the color density, contrast, and sharpness of characters and lines.

The description above has been given for the full-line type recording apparatus that executes multipass printing with a relative scan of a plurality of recording heads as example. Needless to say, the processing method according to this exemplary embodiment can also be applied to serial type recording apparatuses, which are described below in exemplary embodiments 5 and 6. When the processing method according to this exemplary embodiment is applied to the serial type recording apparatuses, the above-described two planes are set to correspond to two relative scans (i.e., two scans of the recording head relative to the recording medium). In this case, the image division precedent processing unit (e.g., first image processor) 104 executes the first processing mode for dividing multivalued image data into a plurality of pieces of multivalued image data corresponding to a plurality of relative scans, and then quantizing each of the plurality of pieces of divided multivalued image data. On the other hand, the binarization precedent processing unit (e.g., second image processor) 106 executes the second processing mode for quantizing multivalued image data into quantized image data, and then dividing the quantized image data into a plurality of pieces of quantized image data corresponding to a plurality of relative scans.

In addition, although the description has been given for an apparatus employing two recording heads for ink of an identical color as example, this exemplary embodiment can also be applied to an apparatus employing three or more recording heads for ink of an identical color. For example, when four recording heads are employed for ink of an identical color, the image divider 1041 of the image division precedent processing unit 104 may divide multivalued image data (e.g., 255) into four planes (e.g., 64, 64, 64, and 64). The binarization processing is then executed on each of the four planes. The image divider 1044 of the binarization precedent processing unit 106 may also divide binary image data into four planes using four mask patterns, which are in a mutual complementary relationship as shown for example in the embodiment of FIG. 19.

Furthermore, the description has been given for the example for realizing K-pass multipass printing by conveying a recoding medium once with respect to K (K is an integer equal to or greater than 2) recording heads for ink of an identical color. However, this exemplary embodiment is not limited to the K-pass multipass printing. For example, this exemplary embodiment can be applied to a case of realizing K×L-pass multipass printing by conveying a recording medium L (L is an integer equal to or greater than 2) times with respect to K (K is an integer equal to or greater than 2) recording heads (K recording element lines) for ink of an identical color.

Moreover, binarization processing is employed as quantization processing in this exemplary embodiment. However, the quantization processing employable in this exemplary embodiment is not limited to binarization processing, and N-value (where N is an integer equal to or greater than 2) quantization processing, such as three-value quantization processing and four-value quantization processing, can also be employed. For example, when the three-value quantization processing is employed, the binarizers 1042 and 1043 may be replaced by three-value quantizers, and ink may be ejected on the basis of three-valued data. The value N of the N-value quantization processing may also be changed between the first processing mode and the second processing mode. For example, three-value quantization processing may be employed in the first processing mode, whereas binarization processing may be employed in the second processing mode. Furthermore, different N-value quantization processing methods may be employed in the first processing mode and the second processing mode. For example, an error diffusion method may be employed in the first processing mode, whereas a dither matrix method may be employed in the second processing mode. Conversely, the dither matrix method may be employed in the first processing mode, whereas the error diffusion method may be employed in the second processing mode.

An exemplary embodiment 2 also employs a recording apparatus shown in FIG. 1 and an image processing process shown in FIG. 5, which have been described in the exemplary embodiment 1. However, a selecting unit 103 according to this exemplary embodiment does not select a mode in accordance with an attribute of image data as in the exemplary embodiment 1, but instead selects the mode in accordance with a gradation level (0-255) of image data.

Figure 9:
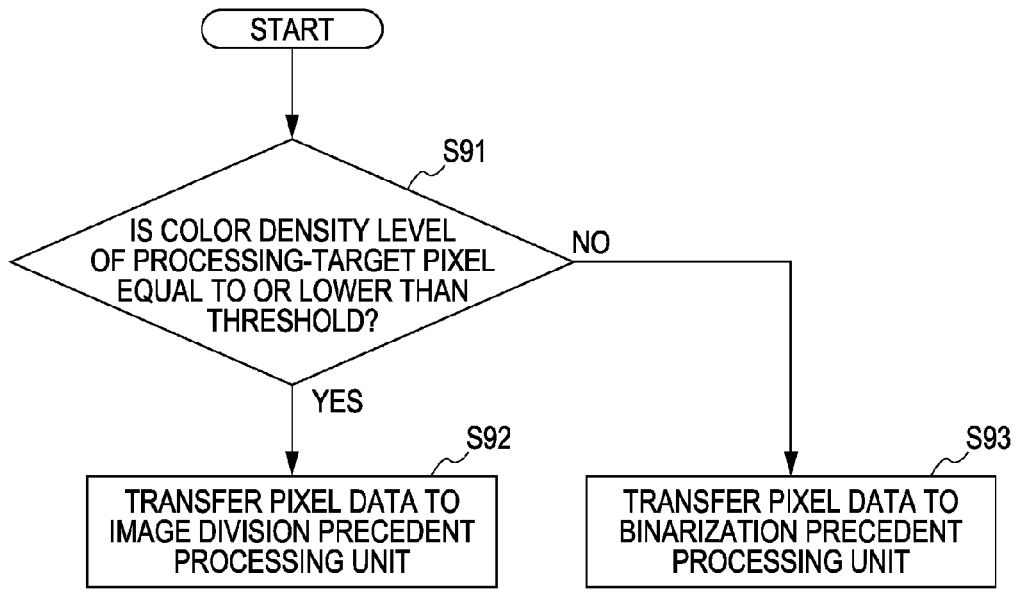
FIG. 9 is a flowchart for describing selection processing executed on each pixel by a selecting unit according to an exemplary embodiment 2 of the present invention.

FIG. 9 is a flowchart for describing mode selection processing executed on each pixel by the selecting unit 103 according to this exemplary embodiment. At step S91, the selecting unit 103 determines whether a gradation level (e.g., color density level) of a focused processing-target pixel is equal to or lower than a predetermined threshold. If it is determined that the gradation level is equal to or lower than the predetermined threshold (YES in step S91), the process proceeds to step S92. At step S92, the selecting unit 103 transfers the processing-target pixel data to the image division precedent processing unit 104. On the other hand, if it is determined that the gradation level is higher than the predetermined threshold (NO in step S91), the process proceeds to step S93. At step S93, the selecting unit 103 transfers the processing-target pixel data to the binarization precedent processing unit 106. Accordingly, if the multivalued image data indicates a low gradation level (low color density), the selecting unit 103 may select a first processing mode for dividing the multivalued image data into, for example, two pieces of multivalued image data corresponding to two recording heads, and then binarizing each of the two pieces of multivalued image data. On the other hand, if the multivalued image data indicates a high gradation level (high color density), the selecting unit 103 may select a second processing mode for dividing the multivalued image data into, for example, two pieces of multivalued image data having a mutual complementary relationship, and then binarizing each of the two pieces of multivalued image data.

Reasons for selecting the first processing mode (e.g., multivalued data division method) if the gradation level of the multivalued image data is equal to or lower than the threshold, and the second processing mode (e.g., mask-employing division method) if the gradation level of the multivalued image data is higher than the threshold, will now be described. In general, character and line patterns may have a relatively high gradation level (color density level) and a relatively large dot recording density. Images, other than characters and lines, having a relatively high gradation level and a relatively large dot recording density are present. However, in this case, as in the case of the character and line patterns, a drastic color density change is less likely to be caused in response to a shift of planes. Accordingly, the second processing mode may be selected for relatively high gradation (e.g., high color density) images, to emphasize sharpness rather than robustness. On the other hand, images (e.g., photographs and graphics) other than characters and lines may have a relatively lower gradation level (e.g., color density level) than the characters and the lines, and may often be halftone images. In the halftone images, a significant color density change is more likely to be caused because of the shift of planes. Accordingly, the first processing mode may be selected for relatively low gradation (e.g., low color density) images, to emphasize robustness rather than sharpness. As described above, in one version both evenness of images and sharpness of character and line patterns can be realized, as in the case of the exemplary embodiment 1, by selecting the processing mode in accordance with the gradation level of image data, for example instead of selecting the processing mode in accordance with the attribute of the image data. Additionally, in this exemplary embodiment, when image data whose attribute cannot be identified is input, an image processing mode suitable for the type of the image data can be selected.

In one version, if a threshold for use in determination of the processing mode is set to a value representing the highest color density (e.g., 255 if 256 gradation levels are employed) at step S91 shown in FIG. 9, character and line patterns can be extracted from general images. However, the threshold employed in this exemplary embodiment is not limited to the above-described value, and can also be set to a lower value, for example as long as the shift of the planes does not result in a substantial color density change and does not substantially stand out. By setting the threshold in this manner, it may be possible to perform image processing emphasizing sharpness rather than robustness on high color density parts of photographs and graphics, in addition to the character and line patterns. Additionally, when a degree of color density unevenness differs, for example, depending on types of a recording medium, different thresholds may be set in accordance to the types of the recording medium.

An exemplary embodiment 3 also employs a recording apparatus shown in FIG. 1 and an image processing process shown in FIG. 5, which have been described in the exemplary embodiment 1. However, a selecting unit 103 according to this exemplary embodiment does not select a mode in accordance with an attribute or a gradation level of image data, but instead selects the mode in accordance with a color of the image data.

Figure 10:
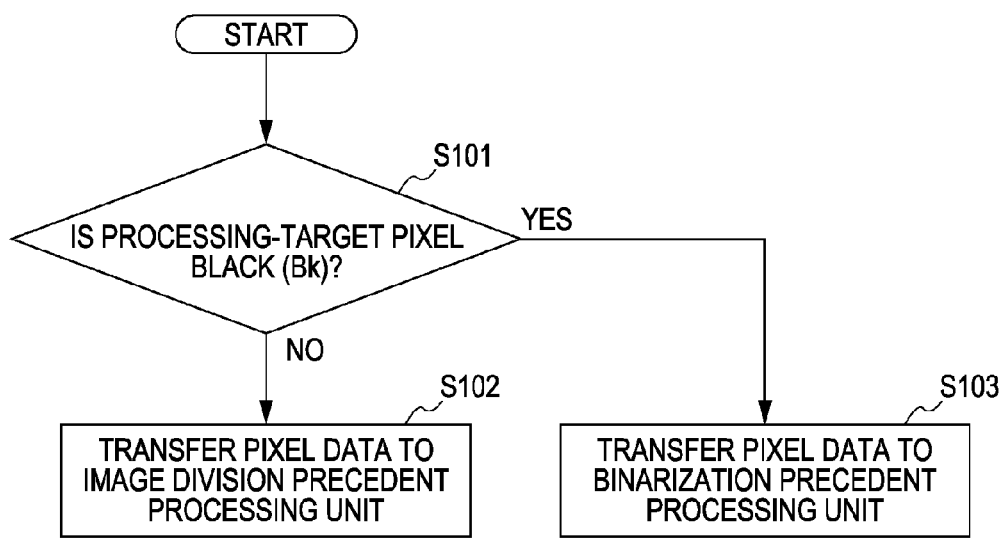
FIG. 10 is a flowchart for describing selection processing executed on each pixel by a selecting unit according to an exemplary embodiment 3 of the present invention.

FIG. 10 is a flowchart for describing mode selection processing executed on each pixel by the selecting unit 103 according to this exemplary embodiment. At step S101, the selecting unit 103 determines whether a color of a focused processing-target pixel is black (Bk). If it is determined that the color is not black (NO in step S101), the process proceeds to step S102. At step S102, the selecting unit 103 transfers the processing-target pixel data to the image division precedent processing unit 104. On the other hand, if it is determined that the color of the processing-target pixel data is black (YES in step S101), the process proceeds to step S103. At step S103, the selecting unit 103 transfers the processing-target pixel data to the binarization precedent processing unit 106. When the processing-target pixel includes multivalued data of black (Bk) and multivalued data of a color other than black, the multivalued data of black is transferred to the binarization precedent processing unit 106, and the multivalued image data of color other than black is transferred to the image division precedent processing unit 104. Accordingly, if the multivalued image data indicates a color other than black, the selecting unit 103 selects a first processing mode for dividing the multivalued image data into, for example, two pieces of multivalued image data corresponding to two recording heads, and then binarizing each of the two pieces of multivalued image data. On the other hand, if the color of the multivalued image data indicates black, the selecting unit 103 selects a second processing mode for dividing the multivalued image data into, for example, two pieces of multivalued image data having a mutual complementary relationship, and then binarizing each of the two pieces of multivalued image data.

Reasons for selecting the first processing mode (e.g., multivalued data division method) if the color of the multivalued image data is not black, and the second processing mode (e.g., mask-employing division method) if the color of the multivalued image data is black, will now be described. In general, character and line patterns are often recorded with black ink. On the other hand, gray is often expressed by a composite of cyan, magenta, and yellow in images that emphasize evenness, such as in photographs and graphics. In particular, black ink is rarely used in a gradation level lower than the halftone, for which a color density change may be of concern. Accordingly, in one version, both evenness of images and sharpness of character and line patterns can be realized as in the case of the exemplary embodiment 1, by selecting the processing mode in accordance with the color of employed ink as in this exemplary embodiment. In addition, according to this exemplary embodiment, even if image data is input that has been created with an application that does not output an attribute of the image, the recording can be performed in a state similar to a case where image data is input that has been created with an application that does output the attribute.

Meanwhile, the color of ink for use in determination of the processing mode at step S101 shown in the embodiment of FIG. 10 is not limited to black. Although FIG. 1 illustrates an example of employing ink of four colors, recording apparatuses that perform recording using five or more kinds of ink, such as, for example, light cyan, light magenta, gray, red, green, and blue, may also be provided. In this case, in consideration of a balance between robustness and sharpness, the first processing mode may be selected for an ink color for which robustness is more important than sharpness, whereas the second processing mode may be selected for an ink color for which robustness is not considered to be so important. For example, since any color density unevenness of ink having a relatively high brightness (e.g., yellow ink) resulting from a color density change is less likely to stand out, robustness may not be considered to be highly important. Accordingly, the second processing mode may be selected for such ink, while emphasizing sharpness rather than robustness.

Figure 11:
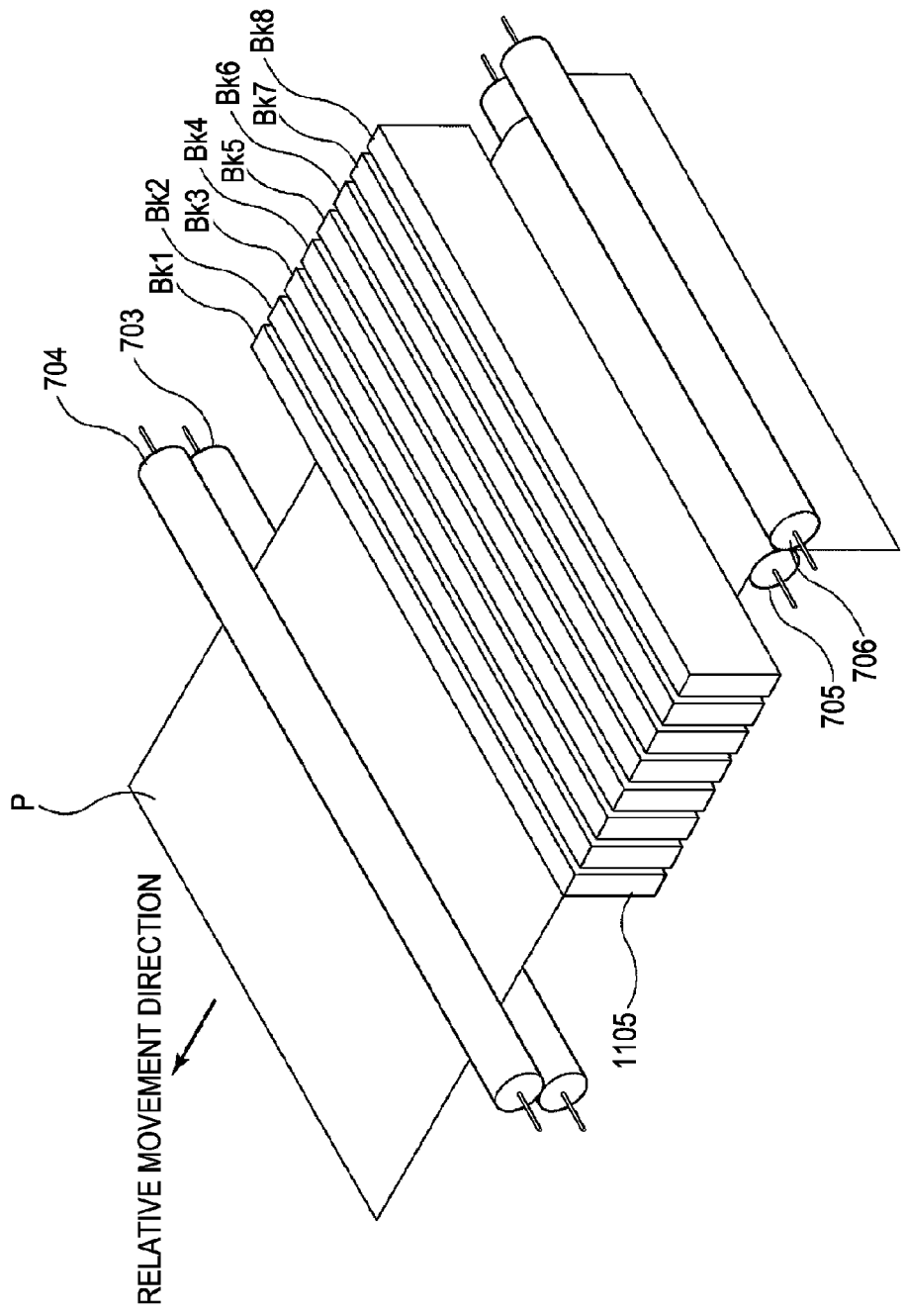
FIG. 11 is a schematic diagram for describing an internal configuration of a full-line type inkjet recording apparatus employed in an exemplary embodiment 4 of the present invention.

FIG. 11 is a schematic diagram for describing an internal configuration of a full-line type inkjet recording apparatus employed in an exemplary embodiment 4. The recording apparatus employed in this exemplary embodiment is a monochrome printer outputting only black images. The configurations of the recording apparatus, other than recording heads 1105, are the same as those described in the above-described exemplary embodiments with reference to FIG. 1.

The recording heads 1105 are full-line type recording heads in which eight black (Bk) recording element lines Bk1-Bk8 are arranged in a parallel relation to each other along a relative movement direction (e.g., conveyance direction) as shown in the drawing. Black image data of each pixel is divided into eight planes and black dots are recorded by eight recording heads (e.g., eight kinds of recording elements) in a line (e.g., unit area) having a width of one dot extending in the relative movement direction (e.g., conveyance direction).

An image processing process employed in this exemplary embodiment is substantially the same as that described in the above-described exemplary embodiments with reference to FIG. 5. However, since CMY data does not exist, a CMYK color conversing unit 102 may perform one-dimension luminance-to-density conversion processing. A selecting unit 103 according to this exemplary embodiment selects, for each pixel, an image processing mode (e.g., a first processing mode or a second processing mode) for multivalued density data in accordance with an attribute of image data as in the case of the exemplary embodiment 1. However, in this exemplary embodiment, image dividers 1041 and 1044 divide multivalued or binary image data into eight planes. A division ratio employed at the time of division of the image data into the respective planes may be even or uneven. In this case, the image divider 1041 may divide the image data into eight planes by changing the division ratio in accordance with a position of a processing-target pixel, as disclosed for example in Japanese Patent Laid-Open No. 2006-231736.

In addition, regarding an image division method employed in the image divider 1044, for example, periodic mask patterns as shown in the examples of FIGS. 20A-20H, or relatively random mask patterns as shown in the examples of FIGS. 21A-21H, may be employed. With either method, advantages of this exemplary embodiment can be demonstrated, for example as long as the divided binary image data of eight planes have a mutual complementary relationship.

Although the selecting unit 103 selects the processing mode in accordance with the attribute of image data in this exemplary embodiment, as in the case of the exemplary embodiment 1, the selecting unit 103 may also select the processing mode in accordance with a gradation level (0-255) of the image data, as in the case of the exemplary embodiment 2.

As described above, according to this exemplary embodiment, the image processing mode for realizing multipass printing is selected in accordance with a content (e.g., an attribute or gradation) of multivalued image data of a single color. Accordingly, since the image processing mode suitable for the content of the image data is executed, relatively high-quality single-color images can be obtained regardless of the content of the image data.

In an exemplary embodiment 5, a description will be given for a case where an image is formed with two-pass multipass printing using a serial type recording apparatus. In the above-described exemplary embodiments 1-4, image data is divided into M planes corresponding to M recording element lines (e.g., recording heads) prepared for ink of an identical color. However, in this exemplary embodiment, image data is divided into M planes corresponding to M recording scans relative to a unit area of a recording medium.

Figure 26:
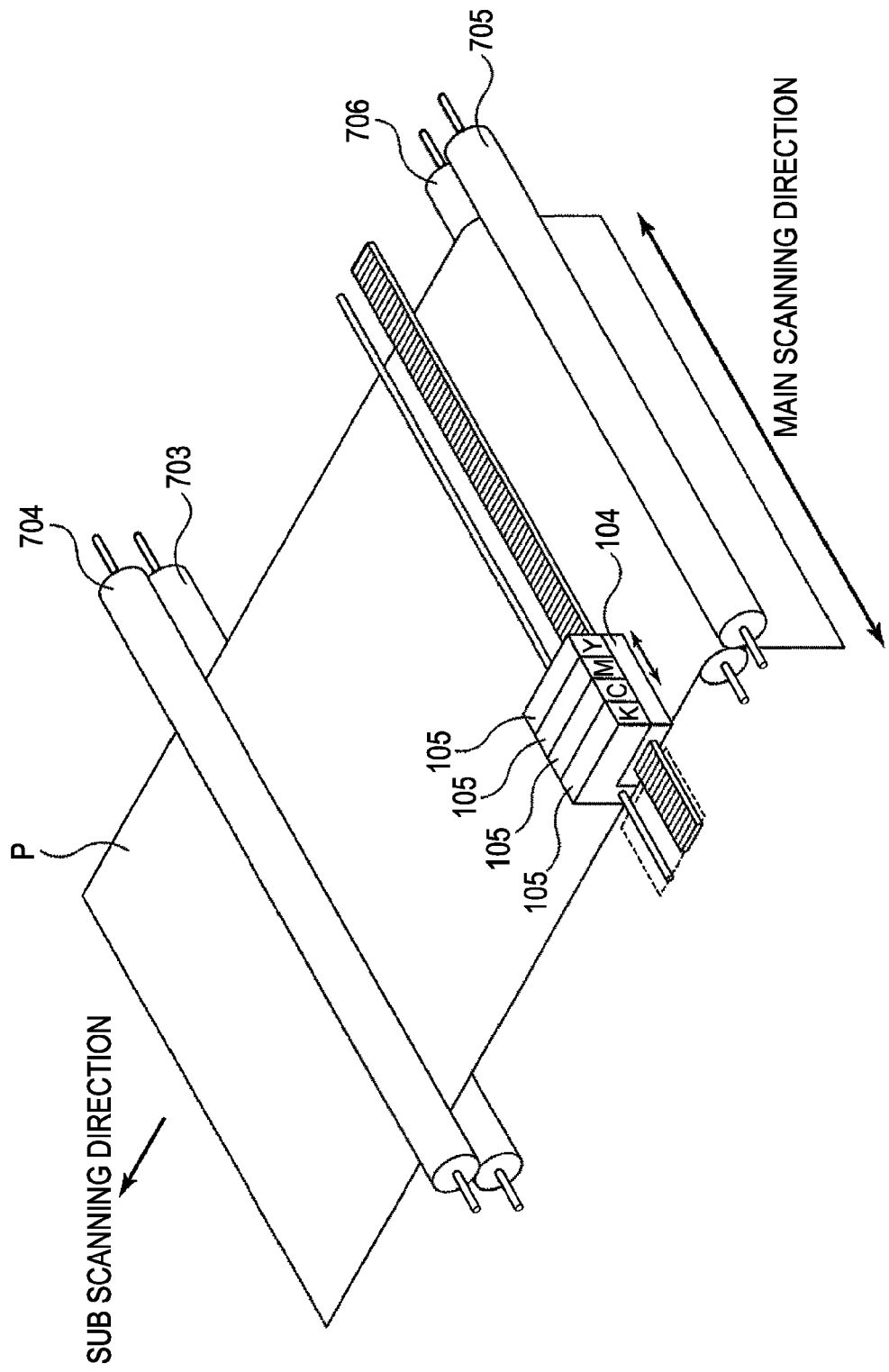
FIG. 26 is a schematic diagram for describing an internal configuration of a serial type inkjet recording apparatus employable in an exemplary embodiment of the present invention.

FIG. 26 is a schematic diagram for describing an internal configuration of a serial-type inkjet recording apparatus employed in this exemplary embodiment. Recording heads 105 are mounted on a carriage 104 for moving in a main scanning direction and eject ink during movement of the carriage 104. After completion of one main recording scan, a conveying roller 704 and an auxiliary roller 703 rotate to convey a recording medium P, which is sandwiched between this pair of rollers and between a feeding roller 705 and an auxiliary roller 706, in a sub scanning direction (e.g. conveyance direction) indicated by the arrow. By repeating the main recording scan and the conveying action, an image may be incrementally recorded on the recording medium P.

In the embodiment as shown, the recording heads 105 include a black (K) recording head, a cyan (C) recording head, a magenta (M) recording head, and a yellow (Y) recording head. These recording heads 105 of four colors are arranged in a parallel relation to each other along a main scanning direction. A plurality of recording elements (nozzles) for ejecting ink is arranged in the recording head of each color in a sub scanning direction at predetermined density. In this exemplary embodiment, 1280 recording elements are arranged in the recording head of each color.

An example of multipass printing employable in this exemplary embodiment of the present invention will now be described with reference to FIG. 27. Although a description will be given for two-pass printing as an example of multipass printing, the present invention is not limited to the two-pass printing, as described later, and M-pass (where M is an integer equal to or greater than 2) printing, such as 3-pass, 4-pass, 8-pass, and 16-pass printing, may also be employed.

Figure 27:
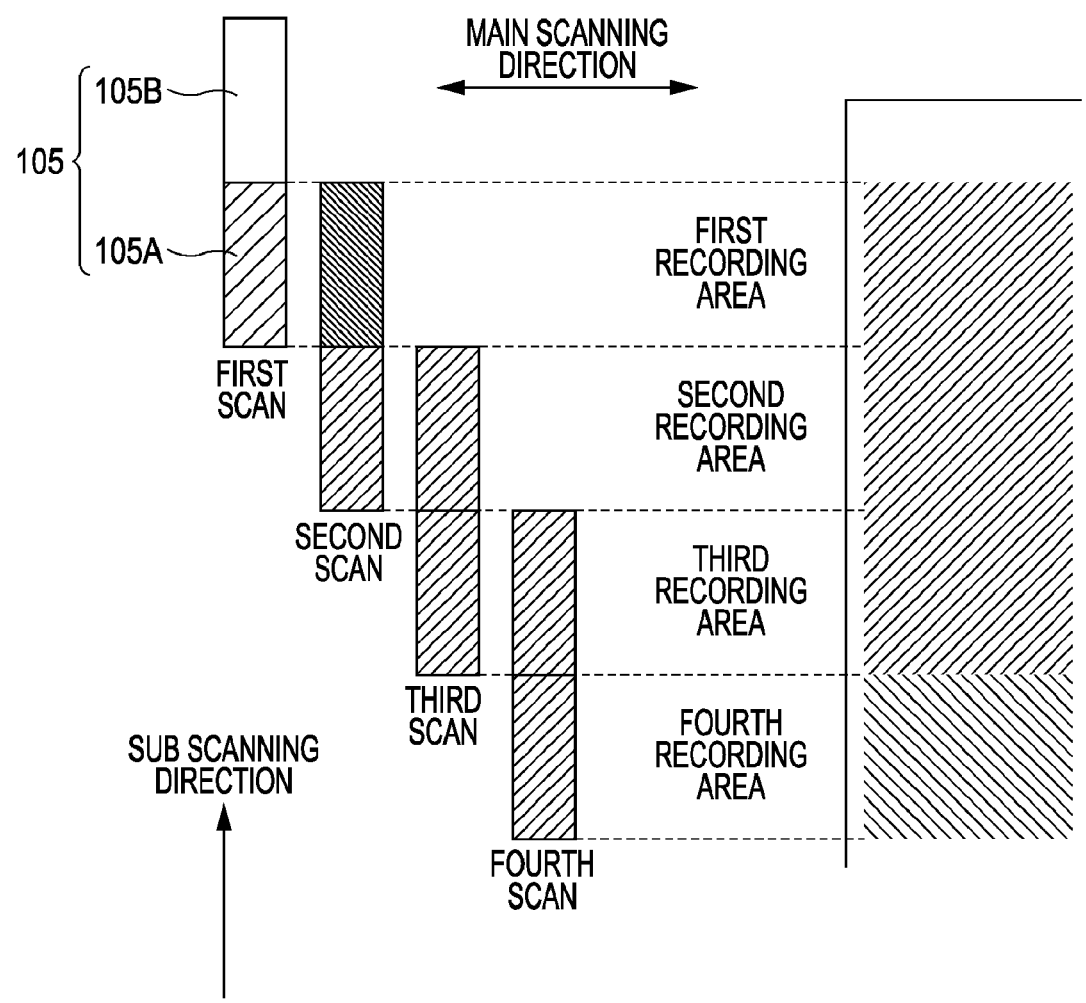
FIG. 27 is a diagram showing an example of a state of two-pass multipass printing.

FIG. 27 is a diagram schematically showing an embodiment of a state of two-pass printing, and shows a relative positional relationship between the recording head 105 and recording areas when recording is performed from a first recording area to a fourth recording area. FIG. 27 shows a recording head of one color among the recording heads 105 of four colors. Hereinafter, a group of nozzles, among the plurality of recording elements (nozzles) of the recording head 105, located on a conveyance direction upstream side are referred to as an upstream side nozzle group 105A, whereas a group of nozzles located on a conveyance direction downstream side is referred to as a downstream side nozzle group 105B. In addition, a width of each recording area in the sub scanning direction (conveyance direction) is equal to a width (640 nozzle width) approximately equivalent to a half of a width (1280 nozzle width) of the plurality of the recording elements arranged in the recording head.

According to this embodiment, in a first scan, part of an image to be recorded in the first recording area is recorded using the upstream side nozzle group 105A. The recording medium is then conveyed along the sub scanning direction by a distance equivalent to 640 nozzles. In a second scan, part of an image to be recorded in the second recording area is recorded using the upstream side nozzle group 105A and the image to be recorded in the first recording area is completed using the downstream side nozzle group 105B. More specifically, part of the image to be recorded in the first recording area that have not been recorded by the upstream side nozzle group 105A is complementary recorded by this downstream side nozzle group 105B. The recording medium is then conveyed along the sub scanning direction by a distance equivalent to 640 nozzles. In a third scan, part of an image to be recorded in the third recording area is recorded using the upstream side nozzle group 105A and the image to be recorded in the second recording area is completed using the downstream side nozzle group 105B. The recording medium is then conveyed along the sub scanning direction by a distance equivalent to 640 nozzles. Lastly, in a fourth scan, part of an image to be recorded in the fourth recording area is recorded using the upstream side nozzle group 105A and the image to be recorded in the third recording area is completed using the downstream side nozzle group 105B. The recording medium is then conveyed along the sub scanning direction by a distance equivalent to 640 nozzles. The similar recording operation is performed on other recording areas. By repeating the main recording scan and the conveying action described above, the image is completed with the two-pass printing.

Figure 12:
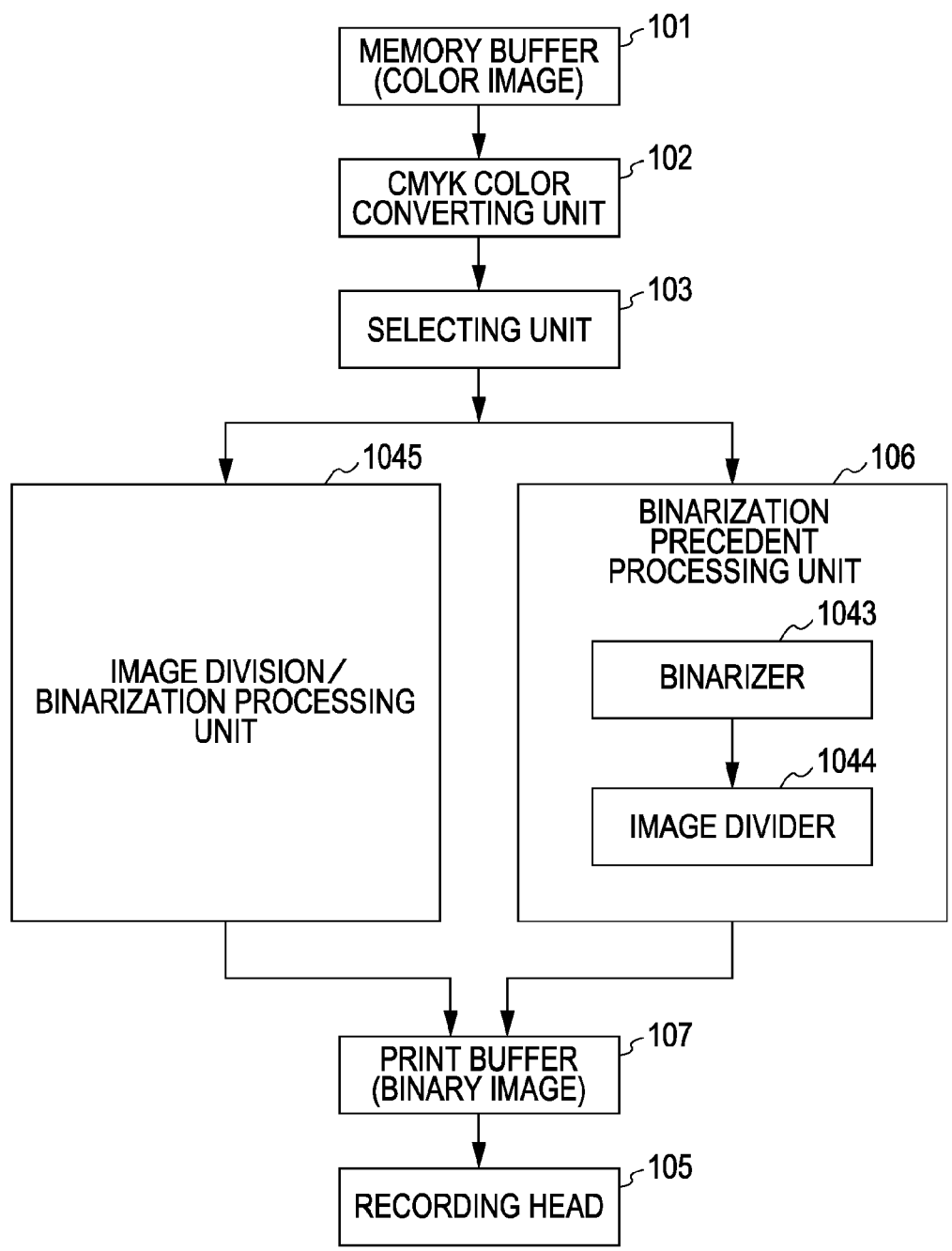
FIG. 12 is a block diagram for describing an image processing process executed by a recording apparatus according to an exemplary embodiment 5 of the present invention.

FIG. 12 is a block diagram for describing an image processing process executed by a recording apparatus according to this exemplary embodiment. The configuration, other than the image division precedent processing unit 104, is the same as those employed in the above-described exemplary embodiments 1-3. More specifically, as in the case of one of the exemplary embodiments 1-3, a selecting unit 103 executes selection processing in accordance with the flowcharts as shown in the embodiments of FIG. 6, 9, or 10. In this exemplary embodiment, multivalued image data is distributed to one of a first image processor (e.g., image division/binarization processing unit 1045) and a second image processor (e.g., binarization precedent processing unit 106) in accordance with a content (e.g., attribute, gradation, or color) of the multivalued image data. The first image processor (e.g., image division/binarization processing unit 1045) executes a first processing mode for dividing the distributed multivalued image data into a plurality of pieces of multivalued image data corresponding to a plurality of relative scans, and then quantizing each of the plurality of pieces of divided multivalued image data. On the other hand, the second image processor (e.g., binarization precedent processing unit 106) executes a second processing mode for quantizing the distributed multivalued image data, and then dividing the quantized image data into a plurality of pieces of quantized image data corresponding to the plurality of relative scans.

Figure 13:
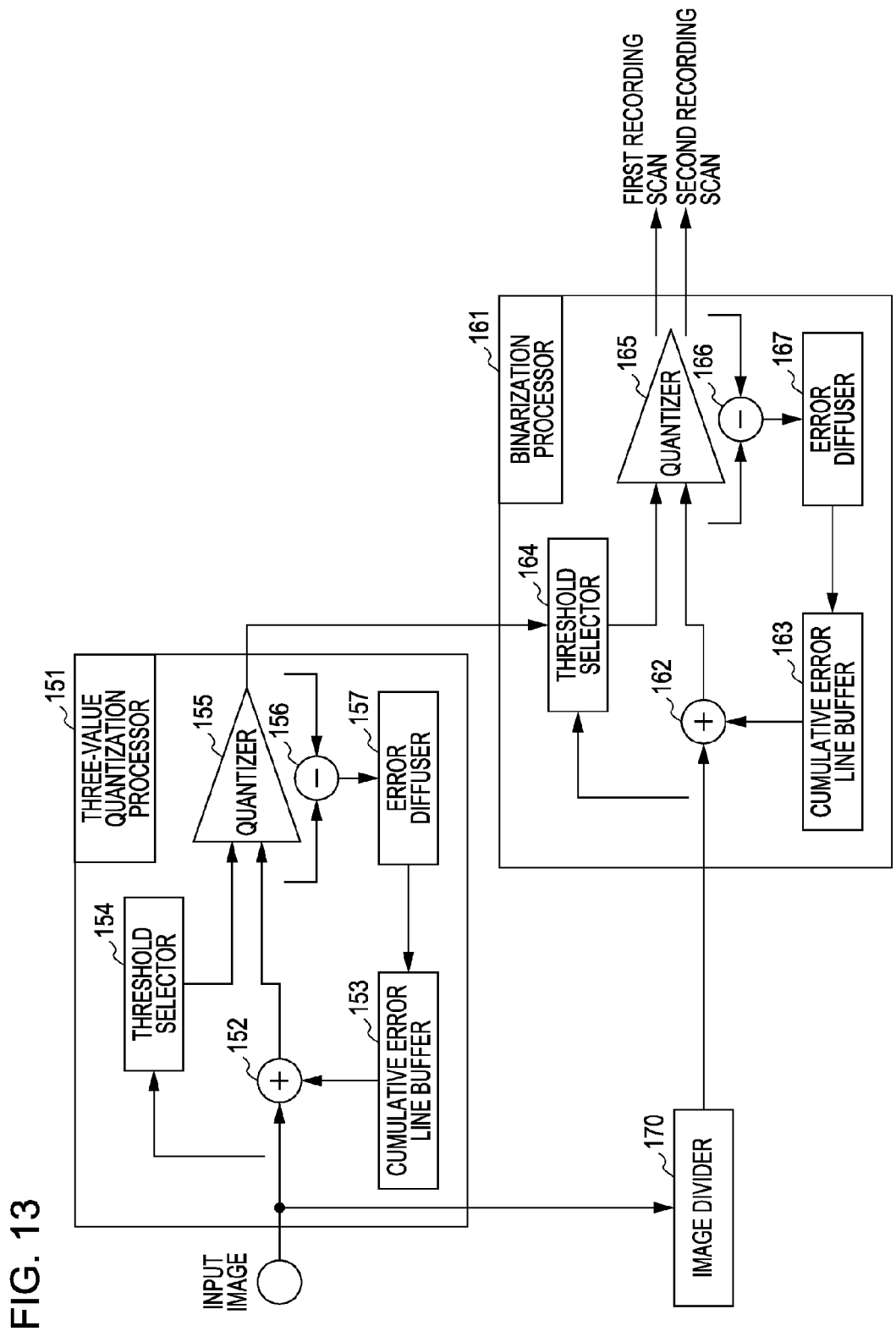
FIG. 13 is a block diagram for describing an embodiment of a configuration of an image division/binarization processing unit.

FIG. 13 is a block diagram for describing an embodiment of a configuration of the image division/binarization processing unit 1045. The image division/binarization processing unit 1045 according to this exemplary embodiment mainly includes an image divider 170, a three-value quantization processor 151, and a binarization processor 161. A description will be given below for a case of performing two-pass multipass printing.

Multivalued image data Input_12 having undergone color separation performed by a CMYK color converting unit 102 and transferred to the image division/binarization processing unit 1045 by the selecting unit 103, is input to the three-value quantization processor 151 and the image divider 170. The three-value quantization processor 151 adds an error Err_12 (x) stored in a cumulative error line buffer 153 with an adder 152 to the multivalued image data Input_12, and transfers the result I_12=Input_12+Err_12(x) to a quantizer 155.

Storage areas Err_12(x) that are as many as the number of pixels w are prepared in the cumulative error line buffer 153 (i.e., $1 \leq x \leq w$). The storage areas Err_12(x) store cumulative errors corresponding to a position x of a focused pixel in the main scanning direction. In addition, an error storage area Err_12_0 for one pixel is also prepared.

On the other hand, a threshold selector 154 selects threshold for use in three-value quantization in accordance with the value of Input_12. In this exemplary embodiment, the input image data Input_12 is represented by an 8-bit signal, namely, levels 0-255. The threshold selector 154 may set a threshold Th_12 as:

Th_12=63 ($0 \leq $ Input_12 <128); and
Th_12=191 ($128 \leq $ Input_12 $\leq 255$).

The quantizer 155 quantizes the error-including image data I_12 into three values using the threshold Th_12 selected by the threshold selector 154. As a result, the quantizer 155 outputs a value Out_12.

More specifically, the quantized output value Out_12 may be represented as follows:
Out_12=0 ($0 \leq $ Input_12<128 and I_12<Th_12=63);
Out_12=127 ($0 \leq $ Input_12<128 and I_12 $\geq $ Th_12=63) or ($128 \leq $ Input_12 $\leq 255$ and I_12<Th_12=191); and
Out_12=255 ($128 \leq $ Input_12 $\leq 255$ and I_12 $\geq $ Th_12=191).

In this exemplary embodiment, the value Out_12 is a value representing, in three steps, the number of dots to be recorded regarding the processing-target pixel in the first and second scans. More specifically, "Out_12=0" indicates that no dots are recorded regarding the processing-target pixel. "Out_12=127" indicates that one dot is recorded regarding the processing-target pixel in either the first or second scan. In addition, "Out_12=255" indicates that two dots are recorded regarding the processing-target pixel in both of the first and second scans.

An error calculator 156 calculates an error Err_12 caused in the quantization from the input value I_12 and the output value Out_12 of the quantizer 155. More specifically, Err_12=I_12−Out_12 may be performed.

An error diffuser 157 diffuses (i.e., distributes) the error Err_12 to surrounding pixels in accordance with the position x of the processing-target pixel (e.g., focused pixel) in the main scanning direction.

Figure 14:
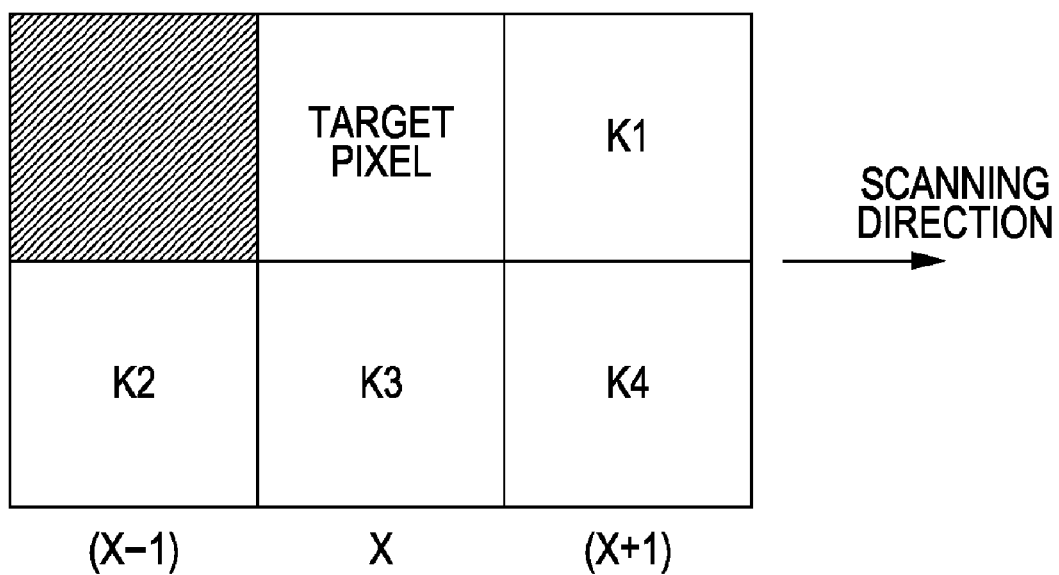
FIG. 14 is a diagram showing an example of an error distribution matrix showing diffusion coefficients applied to surrounding pixels employed when an error diffuser according to an exemplary embodiment 5 of the present invention executes diffusion processing.

FIG. 14 is a diagram showing an example of an error distribution matrix of diffusion coefficients employed in the diffusion processing executed on surrounding pixels by the error diffuser 157. The error is diffused to each surrounding pixel neighboring the focused pixel, as shown in the drawing, in the main and sub scanning directions on the basis of the four coefficients K1-K4 in this exemplary embodiment. In this exemplary embodiment, K1, K2, K3, and K4 are set equal to 7/16, 3/16, 5/16, and 1/16, respectively. More specifically, 7/16 of the error generated in the focused pixel is diffused to a neighboring pixel on the right, which is to be processed after the focused pixel. The rest (9/16) of the error is diffused to pixels in a line (lower line) following a line to which the focused-pixel belongs. The storage areas Err_12(1) to Err_12(w) for managing cumulative errors do not indicate cumulative errors of pixels located in an identical line. With the present embodiment, it is assumed that a coordinate of a focused pixel in the main scanning direction is x. The storage areas Err_12(x+1) to Err_12(w) indicate cumulative errors of pixels in the same line as that of the focused pixel, whereas the storage areas Err_12(1) to Err_12(x) indicate cumulative errors of pixels in a line immediately below the line of the focused pixel. Every time the position of the focused pixel moves forward, the positions indicated by these error storage areas are shifted to the lower line by one pixel. On the other hand, when the error generated in the focused pixel is diffused, the coordinates of pixels located on the right of the focused pixel and at the lower right of the focused pixel in the main scanning direction are (x+1). Accordingly, to store the error for the pixel located at the lower right position separately from the cumulative error Err_12(x+1) of the pixel on the right, the storage area Err_12_0 for one pixel is used. More specifically, errors for the surrounding pixels are diffused and cumulatively added in a manner such as that described below, and results thereof are overwritten in the cumulative error line buffer 153.

$$E\_12(x+1)=E\_12(x+1)+\text{Err}\_12 \times K1 (x<W)$$

$$E\_12(x-1)=E\_12(x-1)+\text{Err}\_12 \times K2 (x>1)$$

$$E\_12(x)=\text{Err}\_12\_0+\text{Err}\_12 \times K3 (1<x<W)$$

$$E\_12(x)=\text{Err}\_12\_0+\text{Err}\_12 \times (K2+K3)(x=1)$$

$$E\_12(x)=\text{Err}\_12\_0+\text{Err}\_12 \times (K1+K3+K4)(x=W)$$

$$\text{Err}\_12\_0=\text{Err}\_12 \times K4 (x<W)$$

$$\text{Err}\_12\_0=0$$

Meanwhile, all of initial values stored in the cumulative error line buffer 153 may be set equal to 0 or random values.

On the other hand, the image divider 170 divides the multivalued image data Input_12 into approximately ½, so as to obtain multivalued data reduced by approximately ½ to be recorded in the first and second scans. This division method may be the same as that employed in the above-described exemplary embodiments. More specifically, the multivalued image data Input_12 may be divided into, for example, two pieces at an identical division ratio or at different division ratios. In addition, the multivalued image data may also be divided into two planes (e.g., for the first and second scans), if the input value is equal to or greater than a predetermined threshold, whereas the multivalued image data may be distributed to one of the planes when the input value is smaller than the predetermined threshold. In one version, the distribution destination planes may be switched every P pixels, where P is separately defined. In addition, the distribution destination planes may also be switched in accordance with the color. If the division method employed in the image divider 170 does not have regularity, the number of dots or a dot arrangement does not grow substantially unbalanced in one of the recording scans. More specifically, dots can be distributed and recorded at a suitable ratio in both of the first and second scans. In the case where a user wants to preferentially make the dot arrangement more similar to an optimum one in either recording scan, because of a capability of the image forming apparatus, the image divider 170 may be capable of preferentially distributing the multivalued image data to a scan corresponding to that plane.

The divided multivalued data Input is fed to the binarization processor 161. An adder 162 adds an error Err_1(x) stored in a cumulative error line buffer 163 to the input signal Input and transfers the result I=Input+Err(x) to a quantizer 165.

On the other hand, the input image data Input is also transferred to a threshold selector 164. The threshold selector 164 selects a threshold for use in binarization in accordance with the value of Input. The selection processing performed in this threshold selector 164 may be the same as that performed in the above-described threshold selector 154. However, preparation of a plurality of thresholds in the binarization processor is not mandatory in this exemplary embodiment. The threshold selector 164 may set a threshold Th as
Th=64 (0≦Input≦255)
regardless of the value of the input image data Input. Needless to say, the threshold selector 164 may set the threshold Th in accordance with the value of the input pixel data Input, to avoid a delay in generation of the dots.

The quantizer 165 compares the threshold Th selected by the threshold selector 164, the error-including image data I, and the output value Out_12 of the three-value quantization processor 151, to determine an output value Out_1 for the first scan and an output value Out_2 for the second scan. More specifically, the output values Out_1 and Out_2 may be set as follows:
if Out_12=0, Out_1=0 and Out_2=0;
if Out_12=255, Out_1=1 and Out_2=1; and
if Out_12=127, Out_1=1 and Out_2=0 (Out_12−I<Th) or Out_1=0 and Out_2=1 (Th≦Out_12−I).

With such a configuration, the quantizer 165 may simultaneously determine the output value Out_1 for the first scan and the output value Out_2 for the second scan.

An error calculator 166 calculates an error Err_1, which is a difference between the image data I and the output pixel value Out_1. More specifically, the error calculator 166 may perform the calculation of Err_1=I−Out_1.

In this embodiment, an error diffuser 167 diffuses the error Err_1 to surrounding pixels in accordance with a position x of the processing-target pixel (e.g., focused pixel) in the main scanning direction using the same method as that employed by the three-value quantization processor 151. In this example, it is assumed that the maximum value of the coordinate x, namely, the number of pixels in the main scanning direction, and a cumulative error at the coordinate x, are represented as w and E_1(x), respectively. In this case, the errors may be diffused to the surrounding pixels in the following manner.

$$E\_1(x+1)=E\_1(x)+\text{Err}\_1 \times K1 (x<W)$$

$$E\_1(x-1)=E\_1(x)+\text{Err}\_1 \times K2 (1<x)$$

$$E\_1(x)=\text{Err}\_1\_0+\text{Err}\_1 \times K3 (1<x<W)$$

$$E\_1(x)=\text{Err}\_1\_0+\text{Err}\_1 \times (K2+K3)(x=1)$$

$$E\_1(x)=\text{Err}\_1\_0+\text{Err}\_1 \times (K1+K3+K4)(x=W)$$

$$\text{Err}\_1\_0=\text{Err}\_1 \times K4 (x<W)$$

$$\text{Err}\_1\_0=0 (x=W)$$

To perform the above-described error diffusion and error accumulation, the cumulative error line buffer 163 has a storage area Err_1_0 for one pixel and storage areas E_1(x) for pixels corresponding to the number of pixels w in the main scanning directions. Each time the focused pixel is changed, the errors are accumulated on the basis of Equations given above. The initial values stored in the cumulative error line buffer 163 may be set equal to 0 or random values.

According to the first processing mode of this exemplary embodiment, the binary data for the first scan and the binary data for the second scan can be simultaneously output by a single quantizer 165.

Although the description has been given for a serial type recording apparatus for executing two-pass multipass printing as an example, the processing method according to this exemplary embodiment can also be employed in a full-line type recording apparatus as shown in the exemplary embodiment 1.

In addition, the configuration of this exemplary embodiment can be applied to multipass printing that is other than two-pass printing. For example, when M-pass printing is performed with M (where M is an integer equal to and greater than 2) relative scans, the processing may be performed by the image division/binarization processing unit 1045 described in this exemplary embodiment, after the image data is divided into M planes in processing executed by the image divider 1041 described in the above-described exemplary embodiment.

Additionally, when M-pass printing is performed, the three-value quantization processor 151 may be replaced by a (M+1)-value quantization processor, and image data for (M−1) planes, among M planes resulting from division performed by the image divider 170, may be input to (M−1) binarization processors, respectively. A threshold employed in the K-th binarization processor may be set to 256×(M−K)/M, and a result output by the K-th binarization processor may be treated as an output value for (M×N+K)-th scan. The (M−1)-th binarization processor may output a binarization result for the (M×N+M−1)-th scan and a binarization result for the (M×N+M)-th scan. With such a configuration, M kinds of binary signals corresponding to the respective M recording scans can be output.

According to this exemplary embodiment described above, since the image processing mode suitable for the content (e.g., attribute, gradation, or color) of image data is selected, a relatively high-quality image can be obtained regardless of the content of the image data. In particular, photographs and graphics having improved robustness can be output without substantially reducing the color density, contrast, and sharpness of characters and lines, using a multipass printing method in serial type recording apparatuses.

In an exemplary embodiment 6, a description will be given for a case where an image is recorded with two-pass multipass printing as shown in FIG. 27 using a serial type recording apparatus shown in FIG. 26, as in the case of the exemplary embodiment 5.

Figure 15:
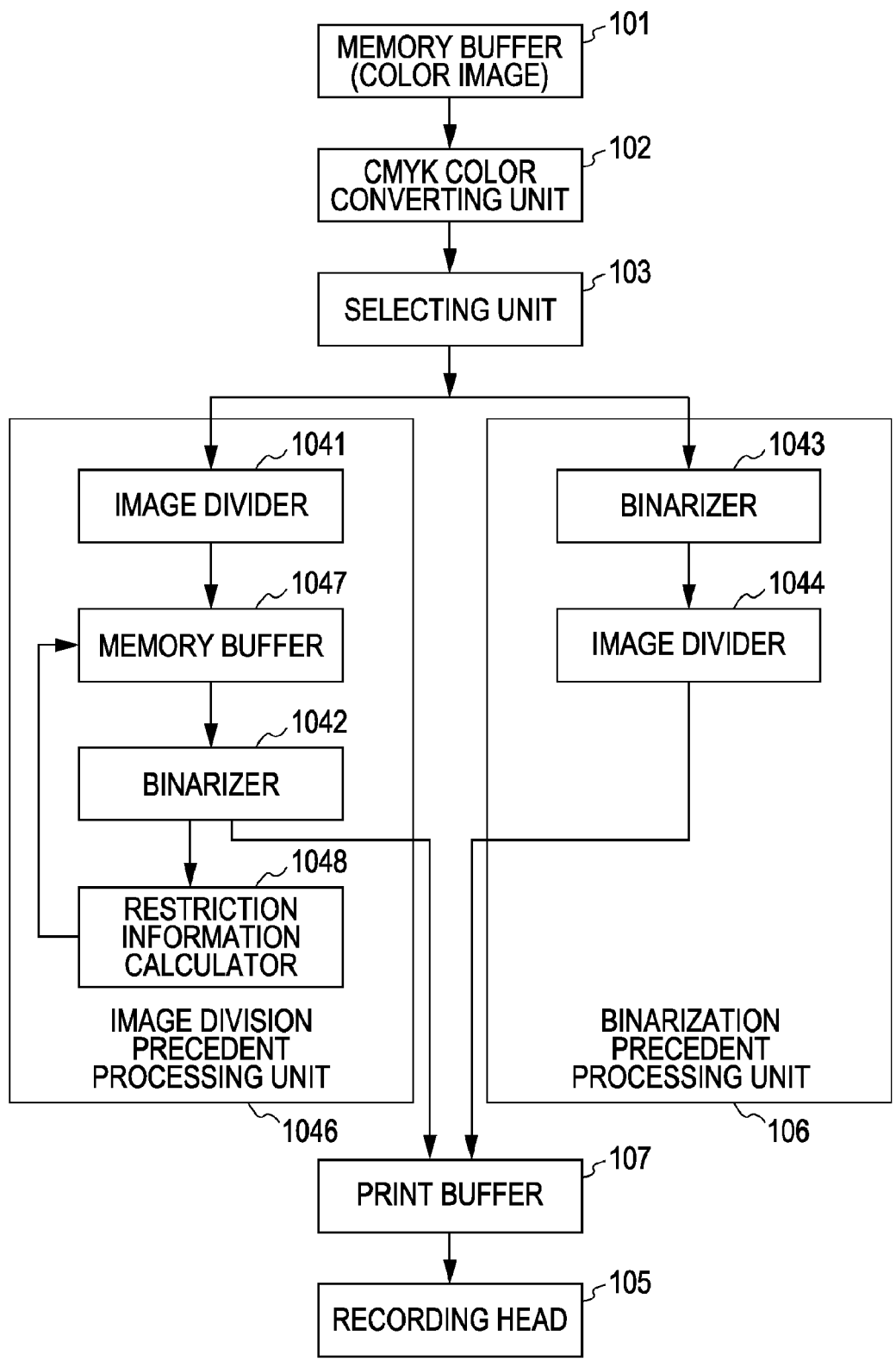
FIG. 15 is a block diagram for describing an image processing process executed by a recording apparatus according to an exemplary embodiment 6 of the present invention.

FIG. 15 is a block diagram for describing an image processing process executed by the recording apparatus employed in this exemplary embodiment. The configuration, other than an image division precedent processing unit 1046, is the same as those described in the exemplary embodiments 1-3. More specifically, in this exemplary embodiment, multivalued image data is distributed to a first image processor (e.g., image division precedent processing unit 1046) or a second image processor (e.g., binarization precedent processing unit 106) for each pixel in accordance with a content (e.g., attribute, gradation, or color) of the multivalued image data. The image division precedent processing unit 1046 executes a first processing mode for performing quantization processing after image division processing. On the other hand, the binarization precedent processing unit 106 executes a second processing mode for performing image division processing after quantization processing.

In this exemplary embodiment, a binarizer 1042 executes binarization processing with consideration of a binarization result of another plane, so that dots to be recorded in an identical recording scan are spread and dots to be recorded in different recording scans do not excessively overlap. More specifically, when sequential quantization processing (sequential binarization processing) is performed on multivalued data of each plane divided by an image divider 1041, binarization processing of a subsequent or following plane is performed on the basis of a result of binarization processing performed on a preceding plane. A procedure of image division precedent processing according to this exemplary embodiment will be described in detail.

In this embodiment, multivalued image data input to the image division precedent processing unit 1046 is divided into two planes by the image divider 1041. The division method employed at this time may be the same as that employed in the above-described exemplary embodiment 1.

According to this embodiment, a plane corresponding to a first recording scan for a unit area of a recording medium is referred to as a first plane, whereas a plane corresponding to a second recording scan for the unit area of the recording medium is referred to as a second plane.

Processing described below may be sequentially performed from the first plane. Multivalued image data of the first plane may be stored in a memory buffer 1047, and may then be transferred to the binarizer 1042.

As in the case of the above-described exemplary embodiment 1, the binarizer 1042 performs binarization processing on each piece of the image data stored in the memory buffer 1047 using at least one of an error diffusion method and a dither matrix method. The obtained binary data is transferred to a print buffer 107. In response to accumulation of image data for one recording scan in the buffer, a recording head 105 performs a recording scan in accordance with the binary data stored in the print buffer 107. The binarization result of the first plane is also transferred to a restriction information calculator 1048.

FIGS. 16A and 16B are diagrams showing examples of coefficients employed when the restriction information calculator 1048 performs a filtering operation on the binary data of the first plane output from the binarizer 1042 and an operation result, respectively. A pixel shown with oblique lines is a focused pixel subjected to processing of the binarizer 1042. The restriction information calculator 1048 distributes the binarization result of the focused pixel to surrounding pixels on the basis of the coefficients shown in FIG. 16A. More specifically, if the value output from the binarizer 1042 is equal to 1 (record), the restriction information calculator 1048 converts this value "1" into a value (e.g., 255) input to the binarizer 1042 from the image divider 1041, and then determines the product of this converted value ("255") and the respective coefficient shown in FIG. 16A. As a result, values of the focused pixel and the surrounding pixels thereof as shown in FIG. 16B are obtained. If the value output from the binarizer 1042 is equal to 1 (record), the distribution result to the surrounding pixels is as shown in FIG. 16B.

Figure 17:
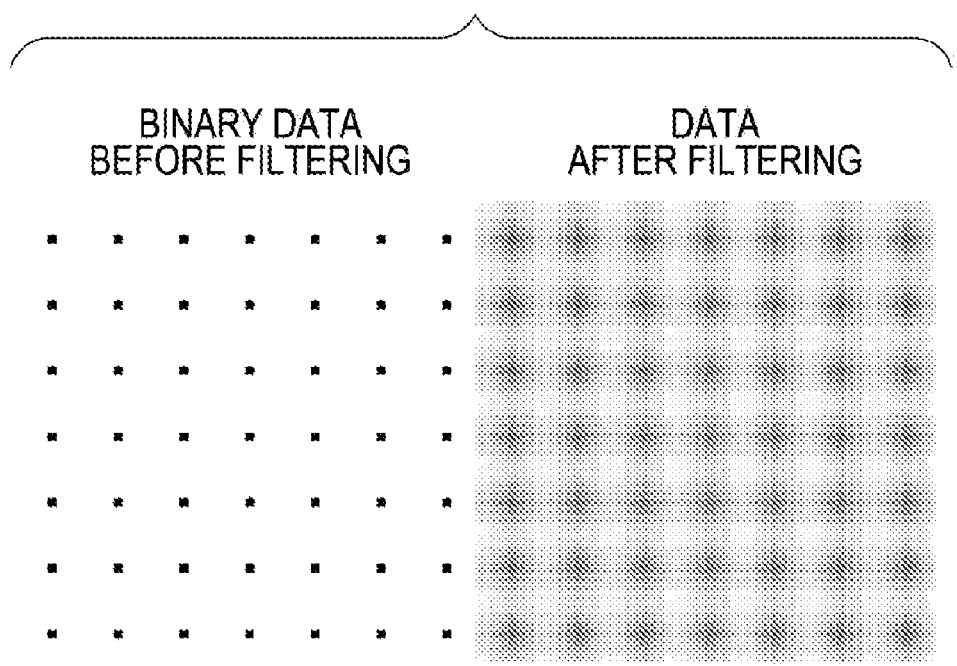
FIG. 17 is an image diagram showing examples of a result output from a binarizer and a result obtained by executing a filtering operation shown in FIGS. 16A and 16B on this output result.
Figure 20A:
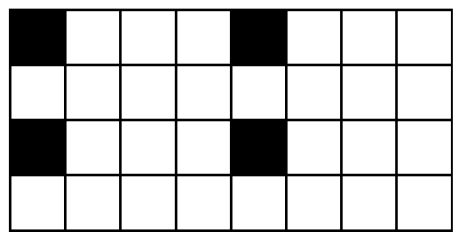
FIGS. 20A-20H are diagrams showing examples of mask patterns that are employable in eight-pass multipass printing.
Figure 20E:
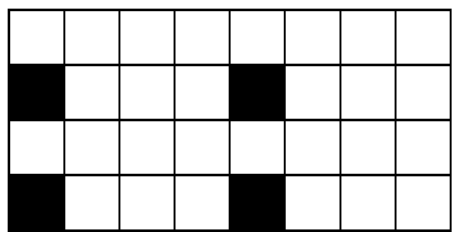
Figure 20B:
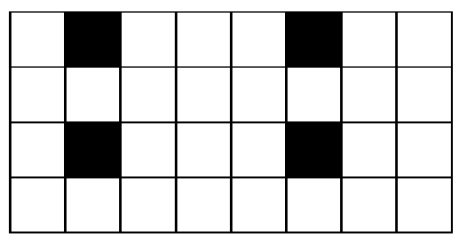
Figure 20F:
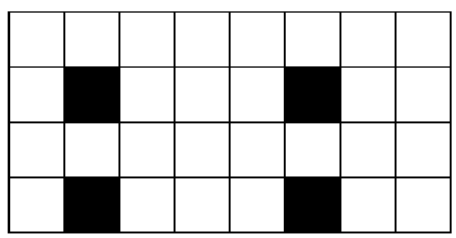
Figure 20C:
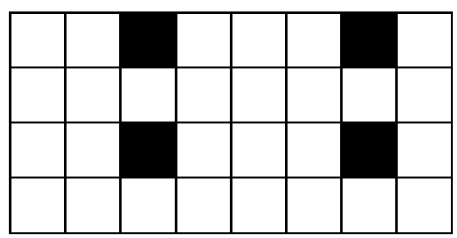
Figure 20G:
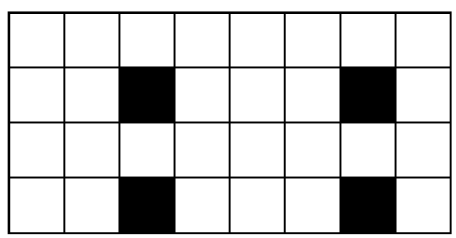
Figure 20D:
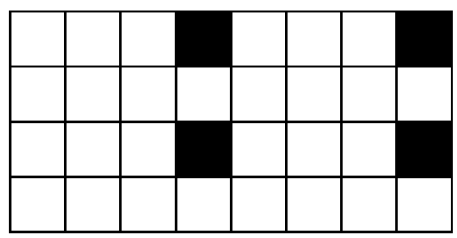
Figure 20H:
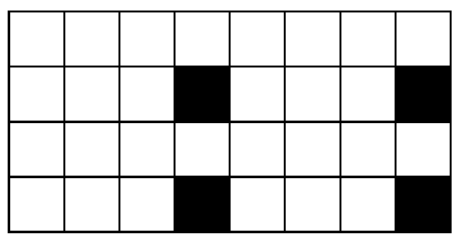
Figure 21A:
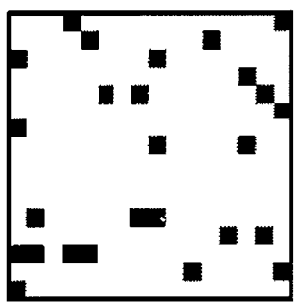
FIGS. 21A-21H are diagrams showing examples of mask patterns that are employable in eight-pass multipass printing.
Figure 21B:
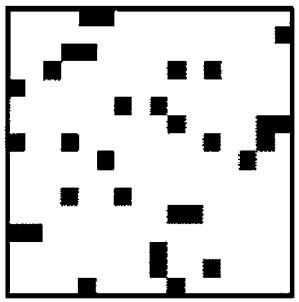
Figure 21C:
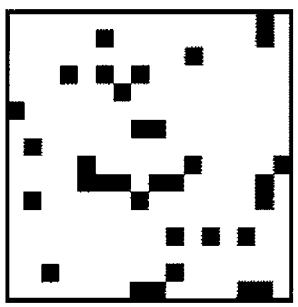
Figure 21D:
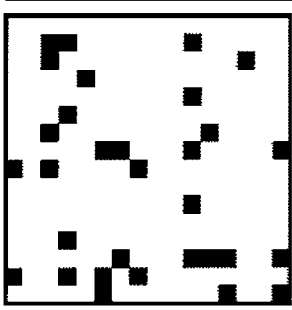
Figure 21E:
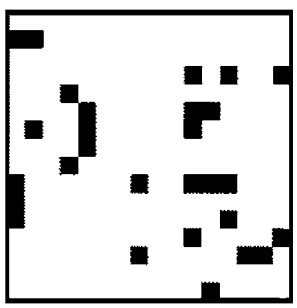
Figure 21F:
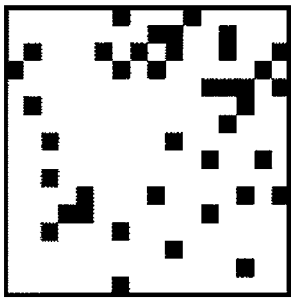
Figure 21G:
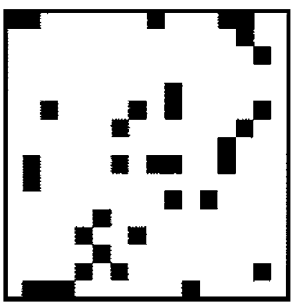
Figure 21H:
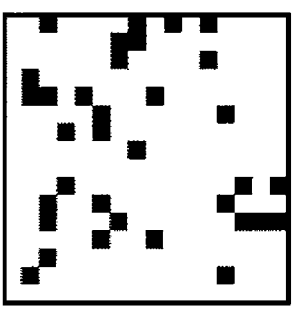

FIG. 17 is a diagram showing an example of a result output from the binarizer 1042 (e.g., binary data before filtering) and a result obtained after performing the filtering processing on this output result (e.g., filtered data). The restriction information calculator 1048 converts the distribution values (e.g., values shown in FIG. 16B) obtained in this manner into negative values, and adds these converted values to multivalued data of the first plane that has not undergone the binarization processing, thereby obtaining correction data (e.g., restriction information). This correction data is multivalued correction data for use in the correction of multivalued image data of the second plane. The multivalued correction data (e.g., restriction information) obtained in this manner is stored in an area of the memory buffer 1047 prepared for pixels of the second plane.

In the following processing for the second plane, multivalued image data is added to the restriction information (e.g., multivalued correction data) previously stored in the memory buffer 1047, and the result is stored. The binarization processing is then performed in the same manner as that performed on the first plane. Obtained binary data is transferred to the print buffer 107. The binarization result of the second plane is not transferred to the restriction information calculator 1048.

According to the above-described processing, pixel data values set to be recorded (1) in the first plane are made smaller than original values in the binarization processing for the second plane, and a probability that recording (1) of the focused pixel and the surrounding pixels thereof is set in the binarization processing is reduced. As a result, in an area of a recording medium on which an image is recorded in the first plane (e.g., first recording scan) and the second plane (e.g., second recording scan), a ratio of pixels for which two recorded dots overlap becomes lower than in the above-described exemplary embodiments. As a result, a deterioration having graininess due to overlapping dots can be suppressed.

As described above, in order to suppress color density variability resulting from a shift of planes, it may be effective for dots recorded in a plurality of recording scans not to have a mutual complementary relationship, i.e., to permit existence of a pixel for which dots recorded in the plurality of recording scans overlap one another. However, existence of too many such pixels may lead to a reduction in color density due to a reduction in a coverage ratio, or deterioration of the graininess due to excessive numbers of overlapping dots. By keeping the ratio of pixels for which dots recorded in a plurality of recording scans overlap one another at a low level while permitting existence of such pixels as in this exemplary embodiment, the color density variability can be suppressed appropriately without providing an excessive number of dot-overlapping pixels. As described above, according to the first processing mode of this exemplary embodiment, dot arrangement having the relatively high color density and the relatively low graininess, and that is resistant to the color density variability, can be obtained.

Additionally, according to this exemplary embodiment, since the error diffusion processing is employed, dots recorded in each recording scan may be spread appropriately, and a low frequency component of an image in such a dot arrangement may be suppressed. Accordingly, the graininess resulting from the dot arrangement in the plane (e.g., an identical recording scan) may become improved. In general, if a shift is caused between planes (e.g., recording scans), a dot arrangement pattern (e.g., texture) may be recognized in each plane, which may be recognized as image degradation. However, if the dot arrangement in each plane has improved graininess as in the first processing mode of this exemplary embodiment, the image degradation is less likely to be caused, even if the shift is caused between the planes. More specifically, according to the first processing mode of this exemplary embodiment, not only is an effect for suppressing the color density variability provided, but also robustness against the texture may be enhanced, and an improved output image having less graininess may be obtained.

Although the description has been given for the two-pass multipass printing as an example above, an image can also be formed with a multipass of more than 2 in this exemplary embodiment. More specifically, this exemplary embodiment may be applicable to M-pass (where M is an integer equal to or greater than 2) multipass printing. When the M-pass multipass printing is performed, the image divider 1041 divides the input multivalued image data into M planes, i.e., the first plane to the M-th plane. The restriction information calculator 1048 sequentially accumulates the result obtained by the performing the filtering operation on the first to (M−1)-th planes in the predetermined pixel positions of the memory buffer 1047. In this manner, for example, when binarization processing of data of the M-th plane is performed, the dots are less likely to be recorded in the M-th recording scan for pixels, for which dots have been recorded (1) in one of the first to (M−1)-th planes. Accordingly, a probability that the dots recorded in different recording scans overlap one another can be decreased.

In this exemplary embodiment, an isotropic weighted average filter, which has an area of 3×3 pixels and in which coefficients are substantially concentrically arranged as shown in the embodiment of FIG. 16A, may be employed as a filter in the restriction information calculator 1048. However, the employable filter is not limited to this particular type, and may also be an anisotropic filter, which has a broader square area of 5×5 pixels and 7×7 pixels, or a rectangular area of 5×7 pixels and 5×9 pixels, and in which filtering coefficients may be arranged elliptically. In addition, the employable filter may be a low-pass filter, a band-pass filter, and a high-pass filter.

As in the case of the exemplary embodiment 1, the selecting unit 103 may select the image processing mode in accordance with an attribute of image data in this exemplary embodiment, although the embodiment is not limited thereto. For example, the image processing mode may be selected in accordance with a gradation level (0-255) of the image data as in the exemplary embodiment 2, or in accordance with the color of the image data as in the exemplary embodiment 3. That is, at least one of the first processing mode and the second processing mode may be selected as the processing mode of multivalued image data in accordance with the content (e.g., attribute, gradation, color, etc.) of the multivalued image data.

Although the description has been given for the exemplary embodiments 1-4 and the exemplary embodiments 5 and 6 while using a full-line type recording apparatus and a serial type recording apparatus, respectively, the processing method according to each exemplary embodiment can also be suitably employed in either or both of the full-line type recording apparatus and the serial type recording apparatus. For example, by replacing the plurality of planes corresponding to a plurality of recording heads in the exemplary embodiments 1-4 with a plurality of planes corresponding to a plurality of relative scans, the processing methods according to the exemplary embodiments 1-4 can be applied to the serial type recording apparatus. Conversely, by replacing a plurality of planes corresponding to a plurality of relative scans in the exemplary embodiments 5 and 6 with a plurality of planes corresponding to a plurality of recoding heads, the processing methods according to the exemplary embodiments 5 and 6 can be applied to the full-line recording apparatus.

Additionally, although inkjet recording apparatuses are employed in all of the exemplary embodiments, the present invention is not limited to such a recording apparatus. Other recording apparatuses that record images on recording media, for example with recording heads for forming dots during relative movements between the recording heads and the recording media, can also suitably employ the present invention.

In addition, the first image processor (104, 1045, or 1046) and the second image processor (106) employ binarization processing as quantization processing in the above-described exemplary embodiments. However, the quantization processing employable in the present invention is not limited to such binarization processing. N-value quantization processing (where N is an integer equal to or greater than 2), such as three-value quantization processing and four-value quantization processing, can also be employed. Also, in this specification, quantization processing performed by the first image processor is referred to as first quantization processing, whereas quantization processing performed by the second image processor is referred to as second quantization processing. Similarly, division processing performed by the first image processor is referred to as first division processing, whereas division processing performed by the second image processor is referred to as second division processing. Furthermore, although two processing modes are selectable by the selecting unit 103 in the above-described exemplary embodiments 1-6, three or more processing modes can also be selected. For example, in the exemplary embodiment 1, a processing mode executable by the image division precedent processing unit 1046 of the exemplary embodiment 6 may be selected in addition to the processing mode executable by the image division precedent processing unit 104 and the processing mode executable by the binarization precedent processing unit 106. That is, the selecting unit 103 may be configured to select at least two processing modes in accordance with the content (e.g., type) of the image data.

In addition, the description has been given for an image processing apparatus for executing characteristic image processing of the present invention using a recording apparatus (e.g., image forming apparatus) shown in FIGS. 5, 12, and 15 having an image processing function as an example. However, the present invention is not limited to such a configuration. In one embodiment, the characteristic image processing of the present invention may be executed by a host apparatus, and binarized image data may be input to a recording apparatus. In addition, it may be configured such that images captured with digital cameras or the like and graphic images are input not through a host apparatus, but directly to a recording apparatus, and all kinds of the above-described characteristic image processing may be executed in the recording apparatus. The host apparatus in the former case, and the recording apparatus in the latter case, may correspond to an embodiment of the image processing apparatus in accordance with the present invention. As is clear from each of the above-described exemplary embodiments, the characteristic image processing in accordance with the present invention may indicate processing for selecting, in accordance with the content (e.g., attribute, gradation, or color) of multivalued image data, either processing for quantizing image data after division of the image data, or processing for dividing image data after quantization of the image data.

In one embodiment, the present invention may also be realized by a storage medium containing program code having computer-executable instructions for realizing aspects of the above-described image processing function. In this case, a computer (or a CPU and an MPU) of a host apparatus or a recording apparatus may read out and execute the program code, whereby aspects of the above-described image processing may be realized. Accordingly, a storage medium containing computer-executable instructions for controlling a computer to execute the above-described image processing is also included as an aspect of the present invention.

For example, the storage medium can comprise at least one of a floppy® disk, a hard disk, an optical disc such as a CD-ROM or CD-R, a magneto-optical disk, a magnetic tape, a non-volatile memory card, and a ROM for providing the computer-executable instructions.

In addition to realization of the functions according to the above-described exemplary embodiments by the computer's execution of the read out computer-executable instructions in the program code, in one embodiment, an operating system running on the computer may execute part of or all of actual processing on the basis of the computer-executable instructions. Furthermore, the computer-executable instructions of the program code may be written in a memory of a function expansion board inserted into the computer, or a function expansion unit connected to the computer, and a CPU or the like may execute part of or all of actual processing on the basis of the computer-executable instructions of the program code.

While the present invention has been described with reference to exemplary embodiments, it is to be understood that the invention is not limited to the exemplary embodiments disclosed herein. The scope of the following claims is to be accorded the broadest interpretation so as to encompass all modifications and equivalent structures and functions.

This application claims the benefit of Japanese Application No. 2007-329339 filed Dec. 20, 2007, which is hereby incorporated by reference herein in its entirety.

What is claimed is:

1. An image processing apparatus for processing multivalued image data corresponding to an image for a pixel area of a recording medium, so as to form the image on the pixel area with a plurality of relative movements of a recording head and the recording medium, the image processing apparatus comprising:
   a first processing unit for dividing the multivalued image data into a plurality of pieces of divided multivalued data corresponding to the plurality of relative movements, and then quantizing each of the plurality of pieces of divided multivalued data so as to produce divided quantized data corresponding to the plurality of relative movements;
   a second processing unit for quantizing the multivalued image data into quantization data, and then dividing the quantization data into a plurality of pieces of divided quantized data corresponding to the plurality of relative movements; and
   a selecting unit configured to select from the first processing unit to process the multivalued image data and the second processing unit to process the multivalued image data, based on a content of the image.

2. The apparatus according to claim 1, wherein the content of the image is an attribute of the image, and
   wherein the selecting unit selects the first processing unit when the attribute of the multivalued image data is neither a character nor a line, whereas the selector selects the second processing unit when the attribute of the multivalued image data is at least one of a character and a line.

3. The apparatus according to claim 1, wherein the content of the image is a gradation level of the multivalued image data, and
   wherein the selecting unit selects the first processing unit when the gradation level of the multivalued image data is not greater than a threshold, whereas the selecting unit selects the second processing unit when the gradation level of the multivalued image data is greater than the threshold.

4. The apparatus according to claim 1, wherein the content of the image is a color of the image, and
   wherein the selecting unit selects the first processing unit when the color of the image is not black, whereas the selecting unit selects the second processing unit when the color of the image is black.

5. The apparatus according to claim 1, wherein
   the first processing unit includes:
      a first divider configured to perform division processing for dividing the multivalued image data into the plurality of pieces of divided multivalued data, and
      a first quantizer configured to perform quantization processing for quantizing each of the plurality of pieces of divided multivalued data that has been divided by the first divider; and
   the second processing unit includes:
      a second quantizer configured to perform quantization processing for quantizing the multivalued image data into quantization data, and
      a second divider configured to perform division processing for dividing the quantization data that has been quantized by the second quantizer into the plurality of pieces of divided quantization data.

6. The apparatus according to claim 5, wherein the first quantizer performs the quantization processing on the divided multivalued data corresponding to a subsequent relative movement of the plurality of relative movements, based on a result of the quantization processing on the divided multivalued data corresponding to a preceding relative movement of the plurality of relative movements.

7. The apparatus according to claim 6, wherein the first quantizer generates correction data for use in correction of the divided multivalued data corresponding to the subsequent relative movement based on the result of the quantization processing on the divided multivalued data corresponding to the preceding relative movement, and performs the quantization processing on the divided multivalued data that has been corrected with the correction data.

8. The apparatus according to claim 5, wherein at least one of the first quantizer and the second quantizer performs the quantization processing using an error diffusion method.

9. The apparatus according to claim 5, wherein at least one of the first quantizer and the second quantizer performs the quantization processing using a dither matrix method.

10. An image processing method for processing multivalued image data corresponding to an image for a pixel area of a non-transitory recording medium, so as to form the image on the pixel area of the non-transitory recording medium with a plurality of relative movements of a recording head and the non-transitory recording medium, the image processing method comprising:

determining whether a content of the multivalued image data is from a first content or a second content; selecting a processing mode from a plurality of processing modes including a first processing mode dividing the multivalued image data into a plurality of pieces of divided multivalued data corresponding to the plurality of relative movements, and then quantizing each of the plurality of pieces of divided multivalued data so as to produce a quantized multivalued data corresponding to the plurality of relative movements when the content of the multivalued image data is the first content, and a second processing mode quantizing the multivalued image data into quantization data, and then dividing the quantization data into a plurality of pieces of divided quantization data corresponding to the plurality of relative movements when the content of the multivalued image data is the second content; and executing the selected processing mode based on the content of the multivalued image data.

11. The method according to claim 10, wherein the first content comprises an attribute of the image being neither a character nor a line, and wherein the second content comprises an attribute of the image being at least one of a character and a line.

* * * * *